(12) United States Patent
Page et al.

(10) Patent No.: US 11,452,957 B2
(45) Date of Patent: Sep. 27, 2022

(54) SAFETY FILTER SNAP FIT SYSTEM

(71) Applicant: CUMMINS FILTRATION IP, INC., Columbus, IN (US)

(72) Inventors: Emmanuel Page, Tremeoc (FR); Ronan Corvec, Quimper (FR); Mark V. Holzmann, Stoughton, WI (US)

(73) Assignee: Cummins Filtration IP, Inc., Columbus, IN (US)

( * ) Notice: Subject to any disclaimer, the term of this patent is extended or adjusted under 35 U.S.C. 154(b) by 62 days.

(21) Appl. No.: 16/538,939

(22) Filed: Aug. 13, 2019

(65) Prior Publication Data
US 2020/0061503 A1 Feb. 27, 2020

Related U.S. Application Data

(60) Provisional application No. 62/721,049, filed on Aug. 22, 2018.

(51) Int. Cl.
*B01D 35/30* (2006.01)
*B01D 46/00* (2022.01)
*B01D 46/42* (2006.01)

(52) U.S. Cl.
CPC ........ *B01D 35/30* (2013.01); *B01D 2201/305* (2013.01)

(58) Field of Classification Search
CPC .................. B01D 2201/4084; B01D 2265/028
See application file for complete search history.

(56) References Cited

U.S. PATENT DOCUMENTS

| | | | |
|---|---|---|---|
| 5,137,632 A * | 8/1992 | Morgan, Jr. ........... | B01D 29/27 210/445 |
| 2005/0055989 A1* | 3/2005 | Morgan ................. | B01D 29/27 55/379 |

* cited by examiner

*Primary Examiner* — Benjamin M Kurtz
(74) *Attorney, Agent, or Firm* — Foley & Lardner LLP

(57) ABSTRACT

A latch element for use with a filter element is described. The latch element includes a first end and a second end spaced laterally from the first end. An engagement portion is disposed between the first end and the second end. The engagement portion is configured to engage a housing. The handle portion is adjacent to the second end. The handle portion is configured to engage the filter element and facilitate removal of the filter element.

14 Claims, 31 Drawing Sheets

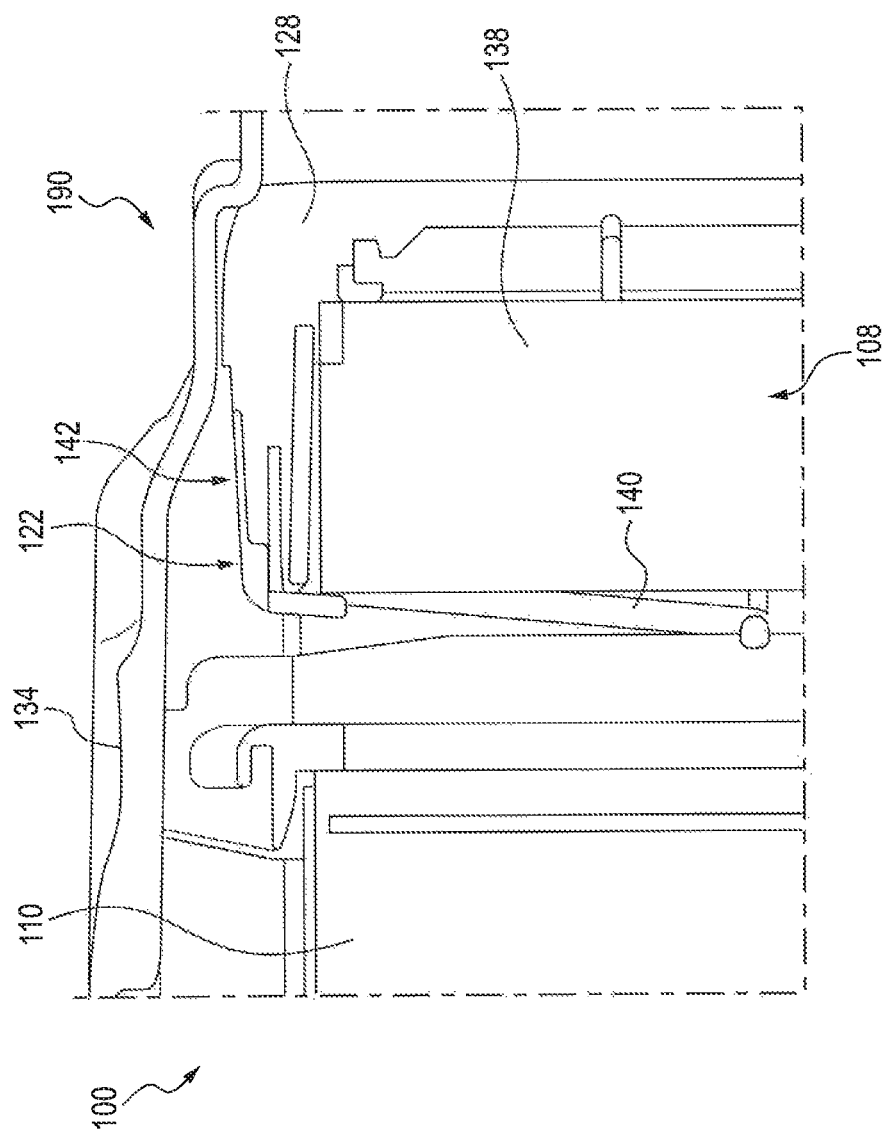

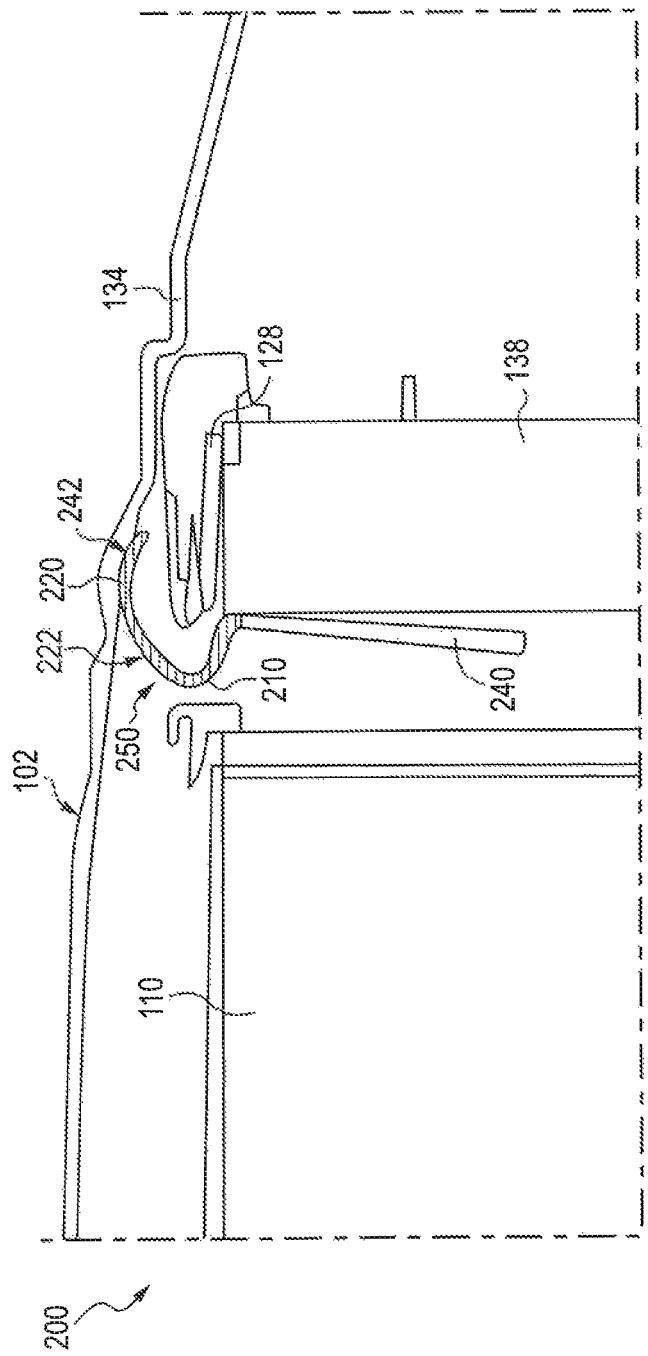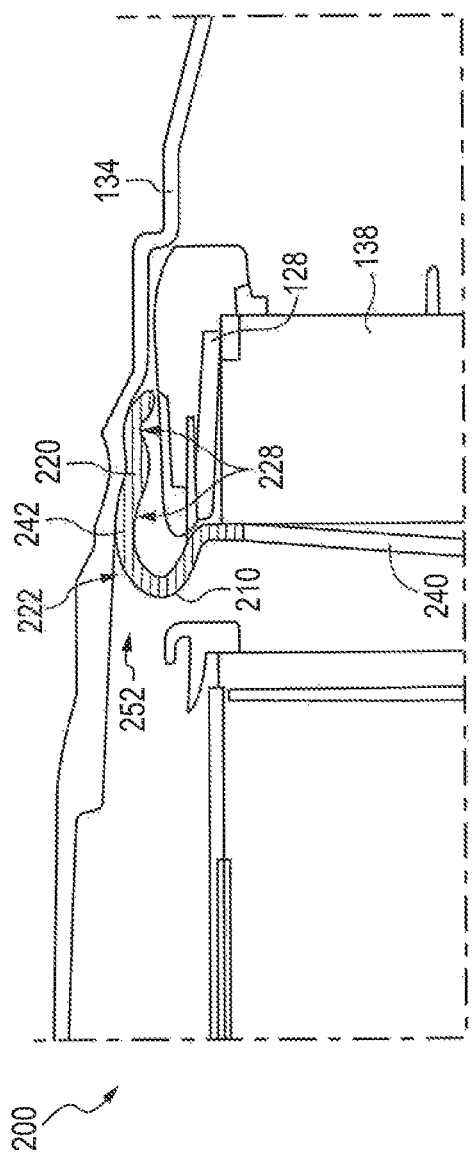
FIG. 2A

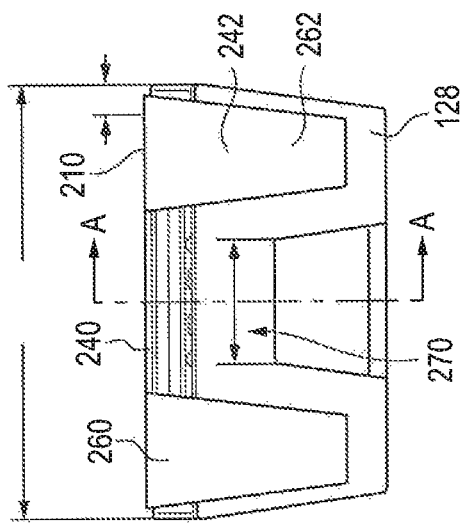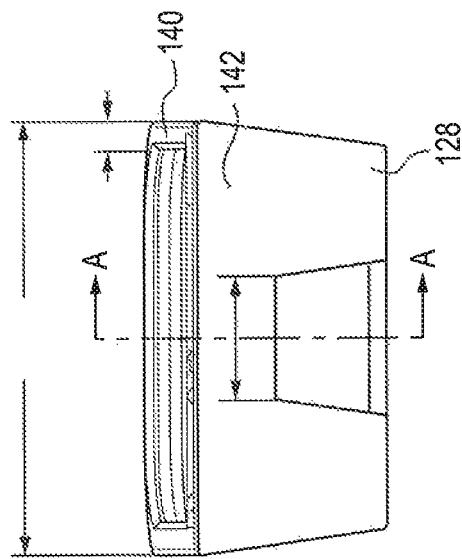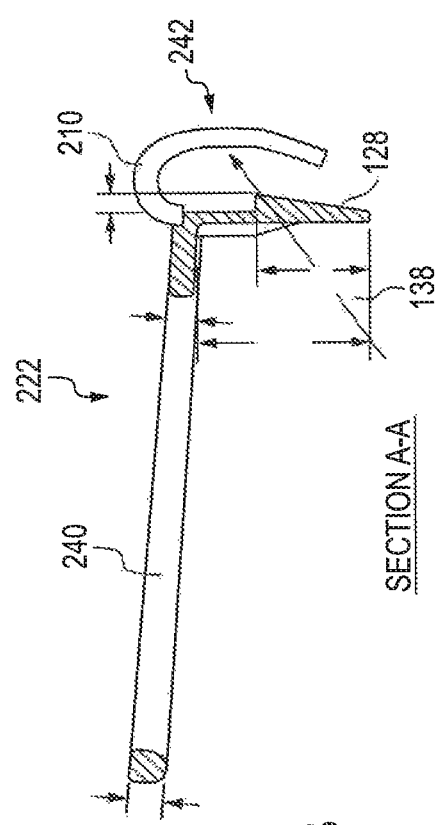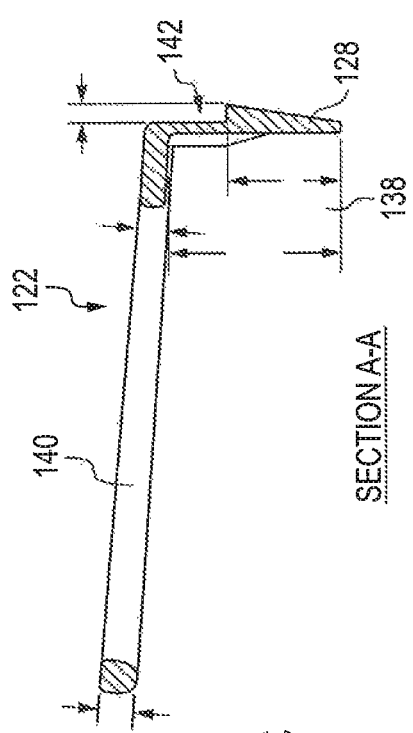
FIG. 2B
FIG. 2C

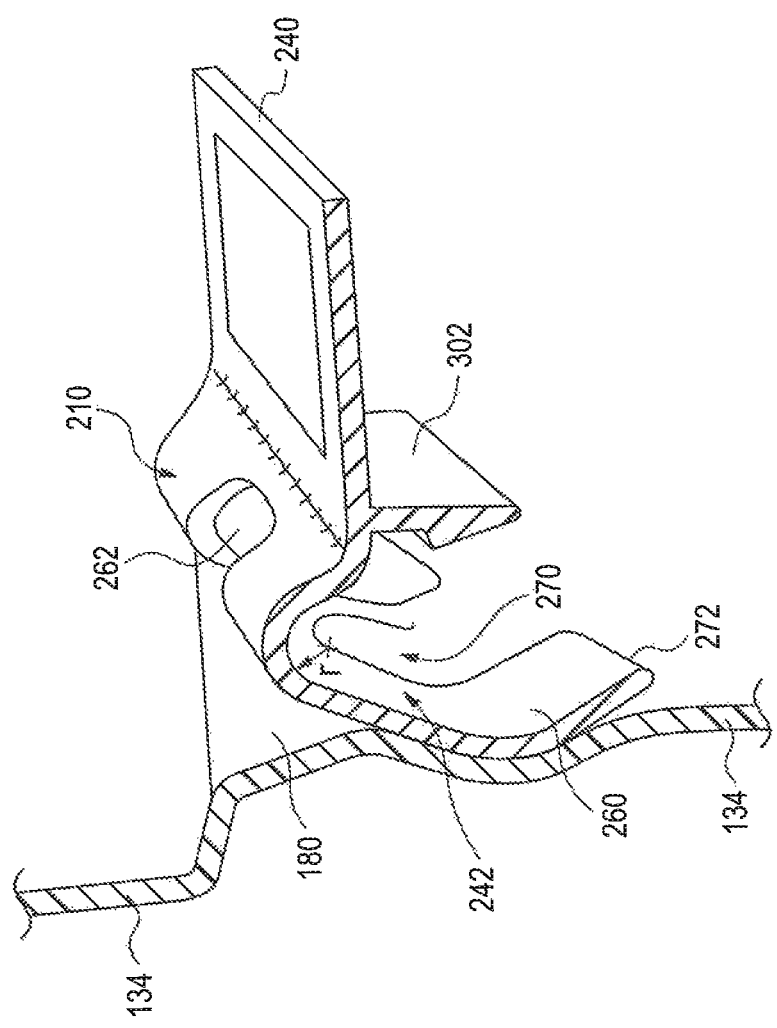

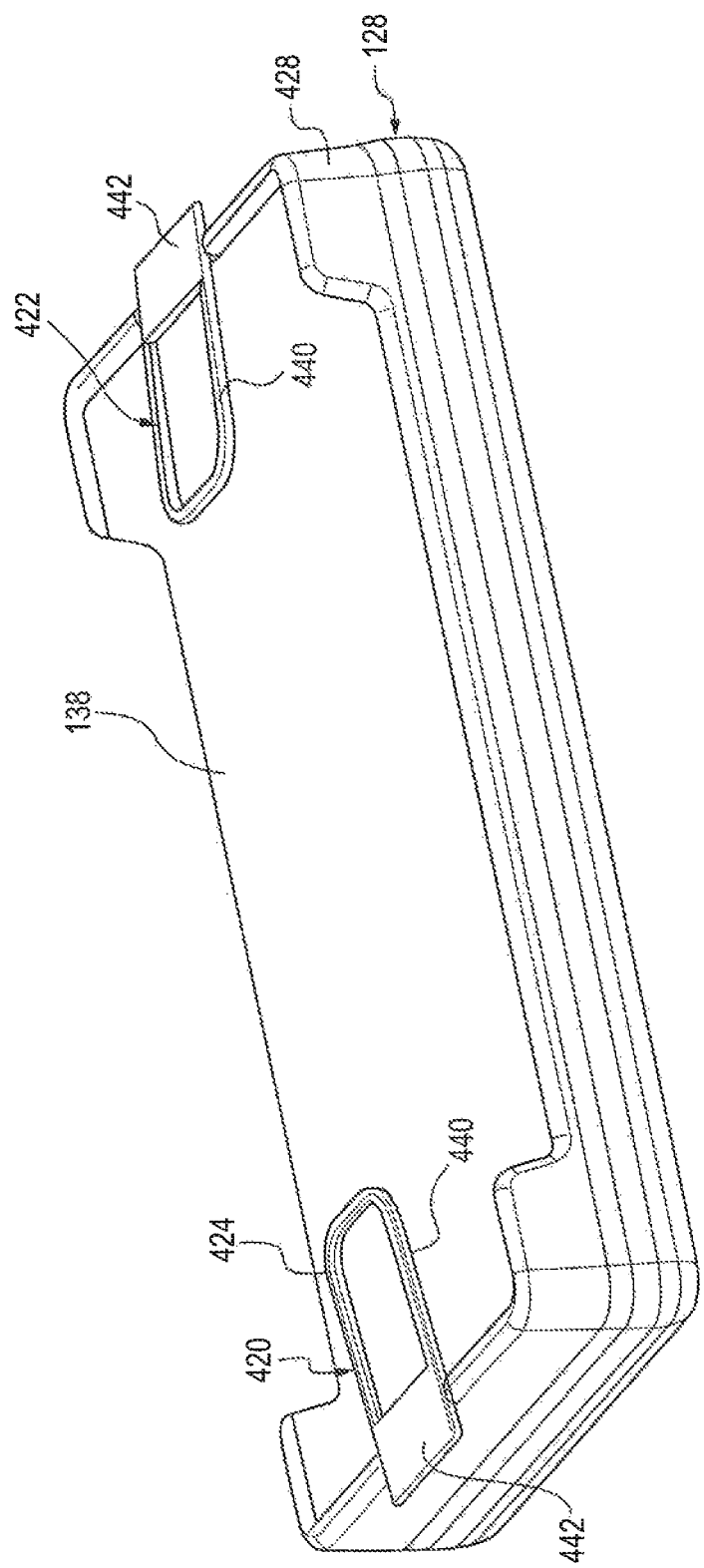

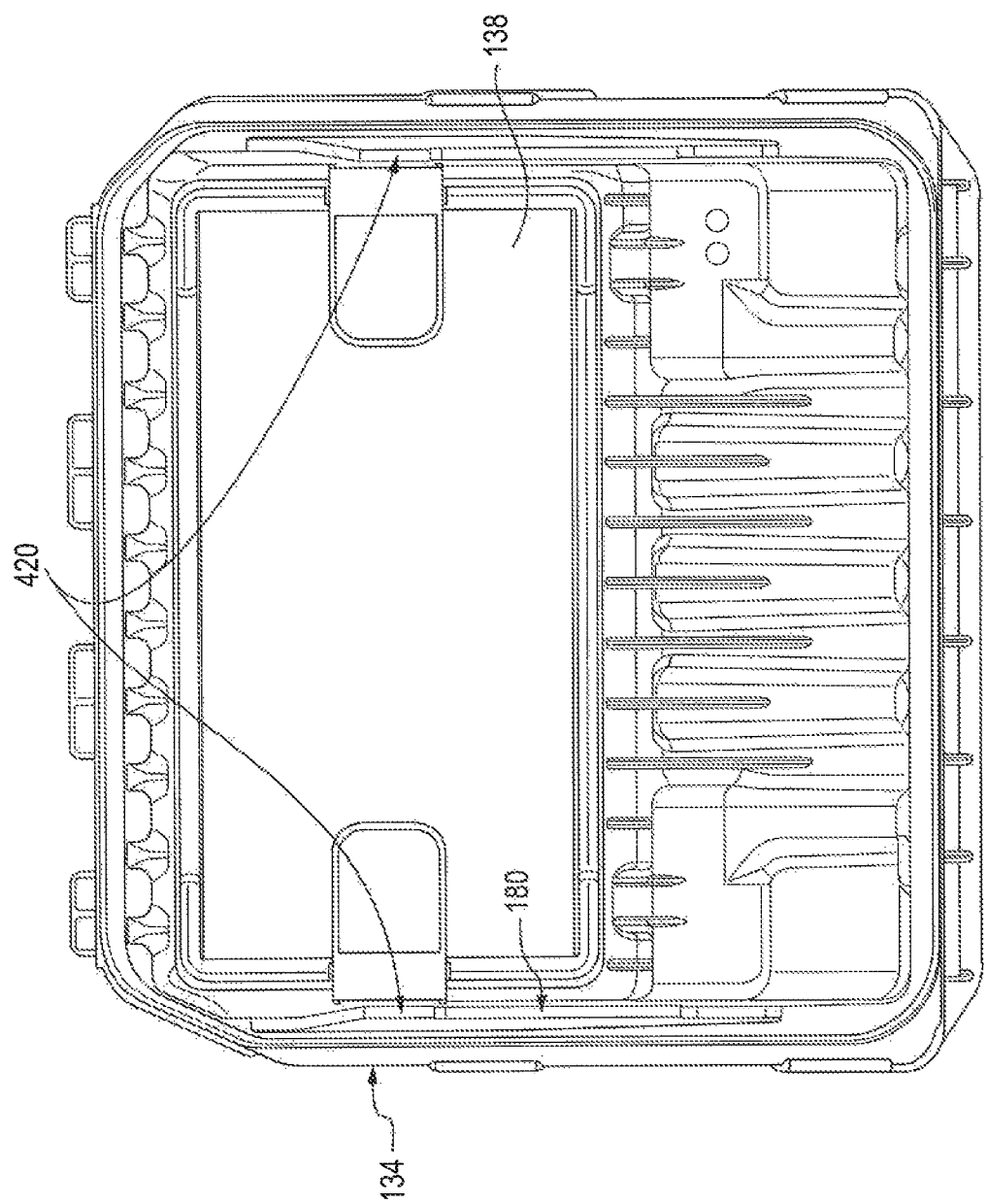

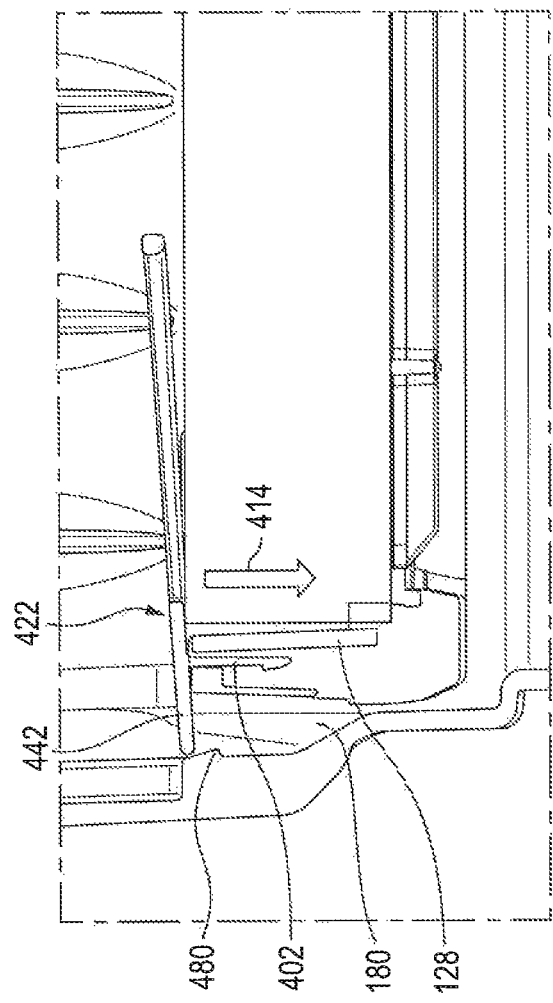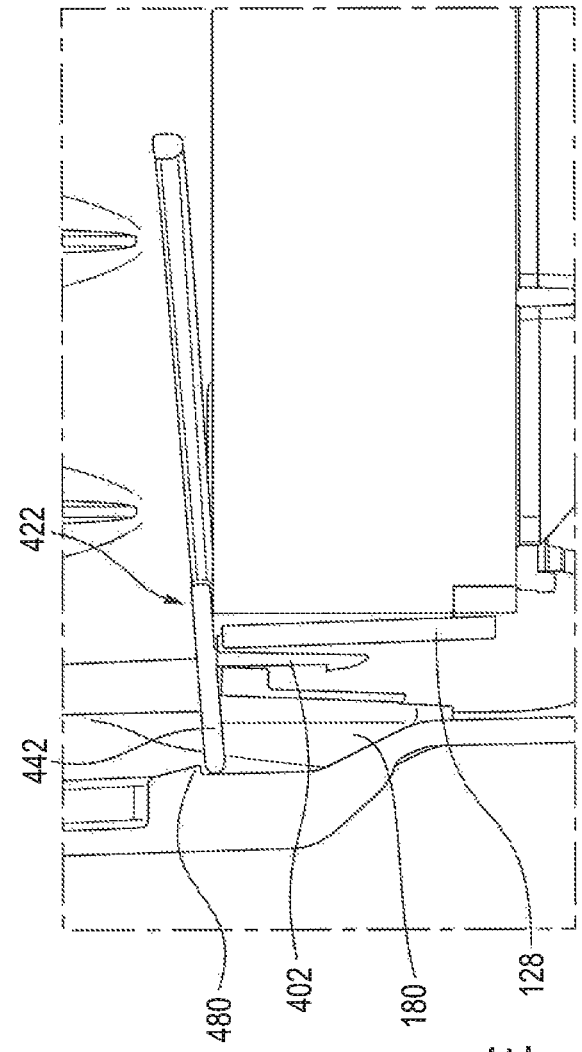

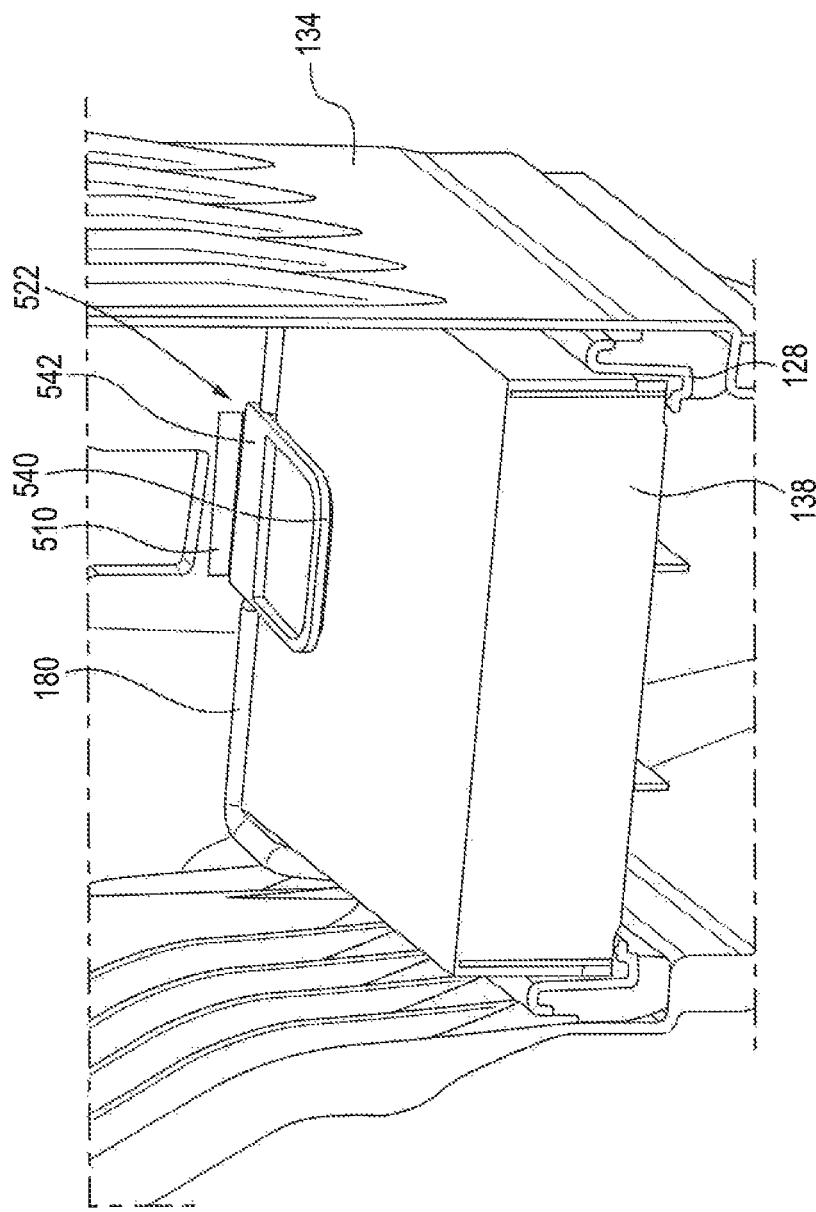

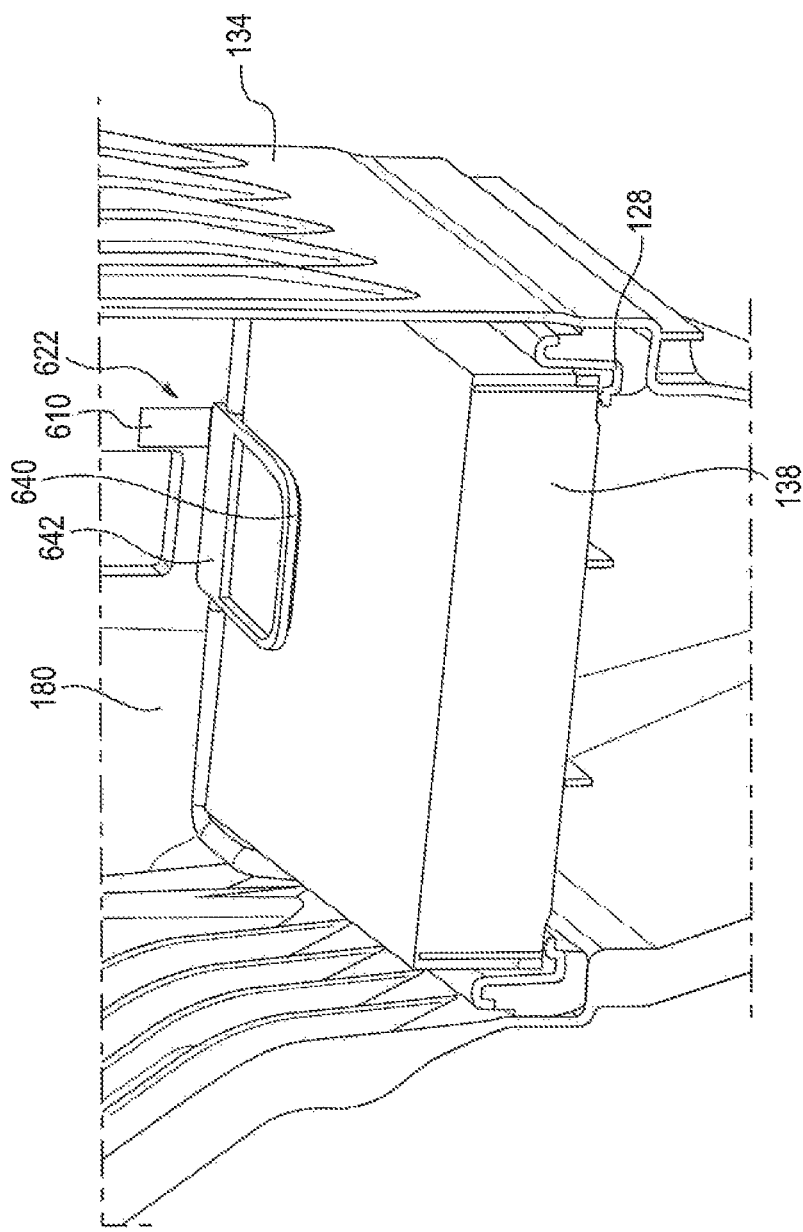

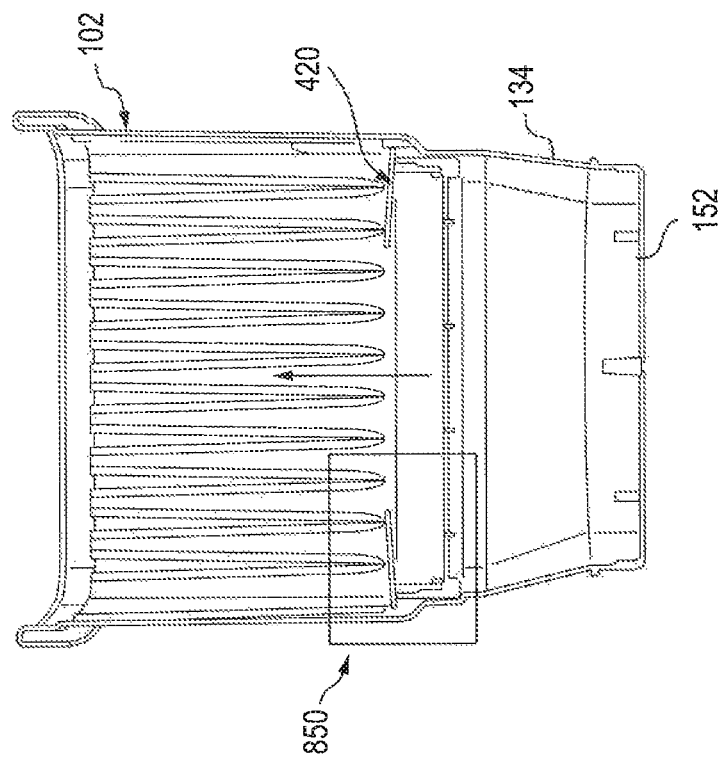
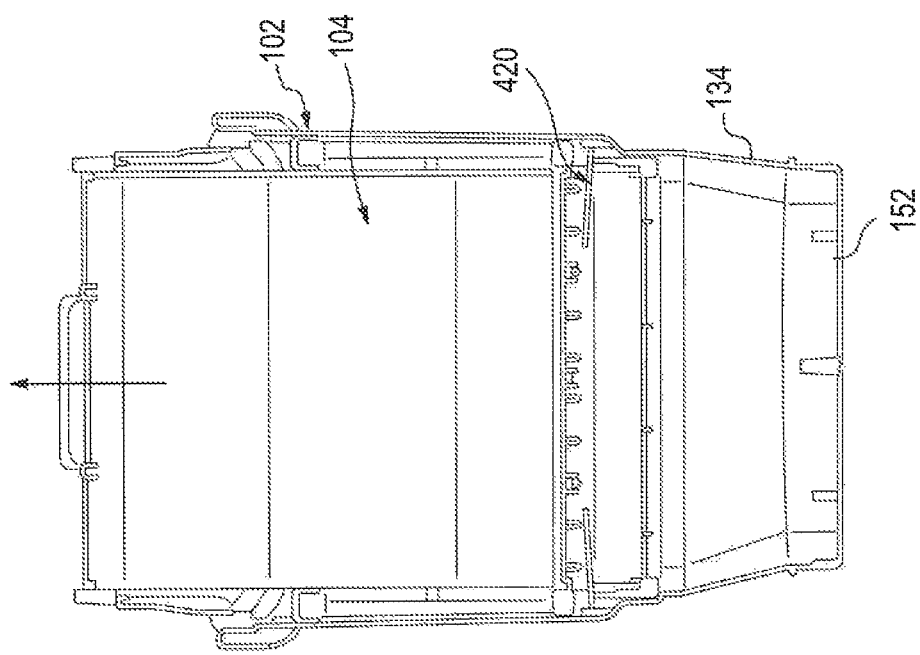
FIG. 8D
FIG. 8C

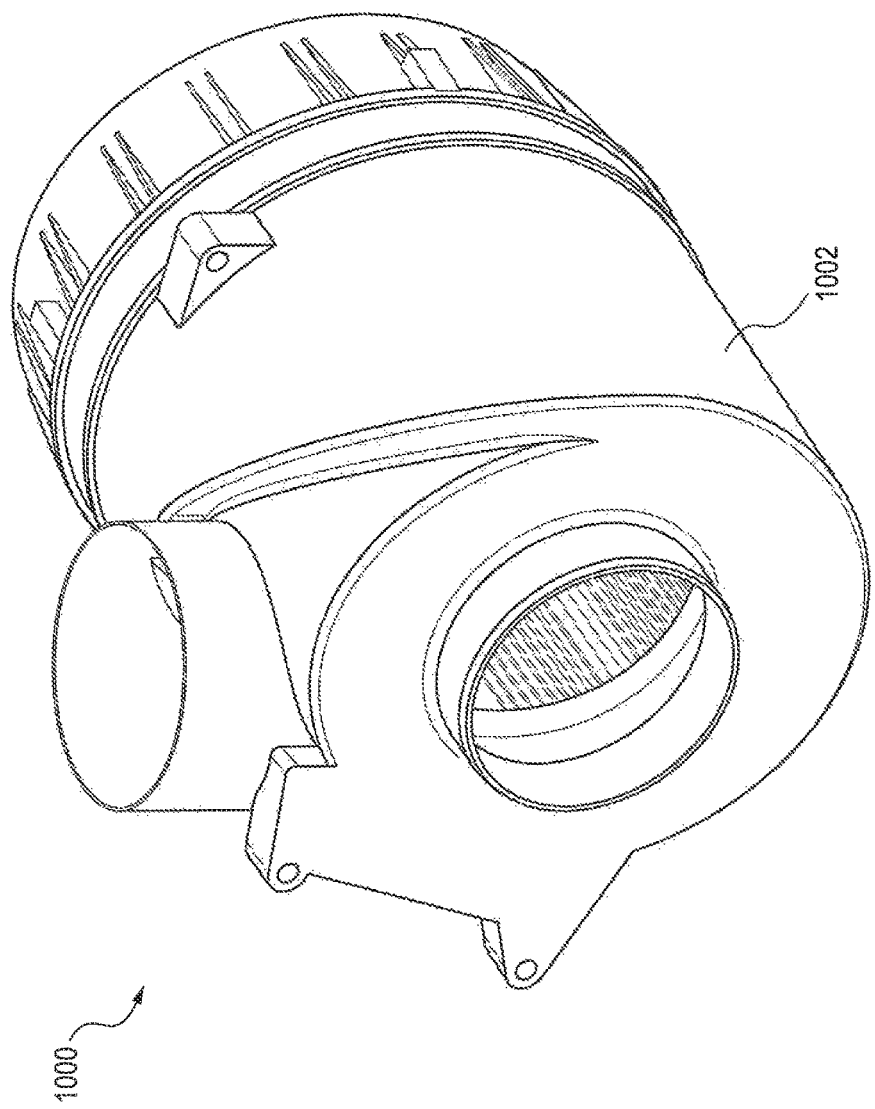

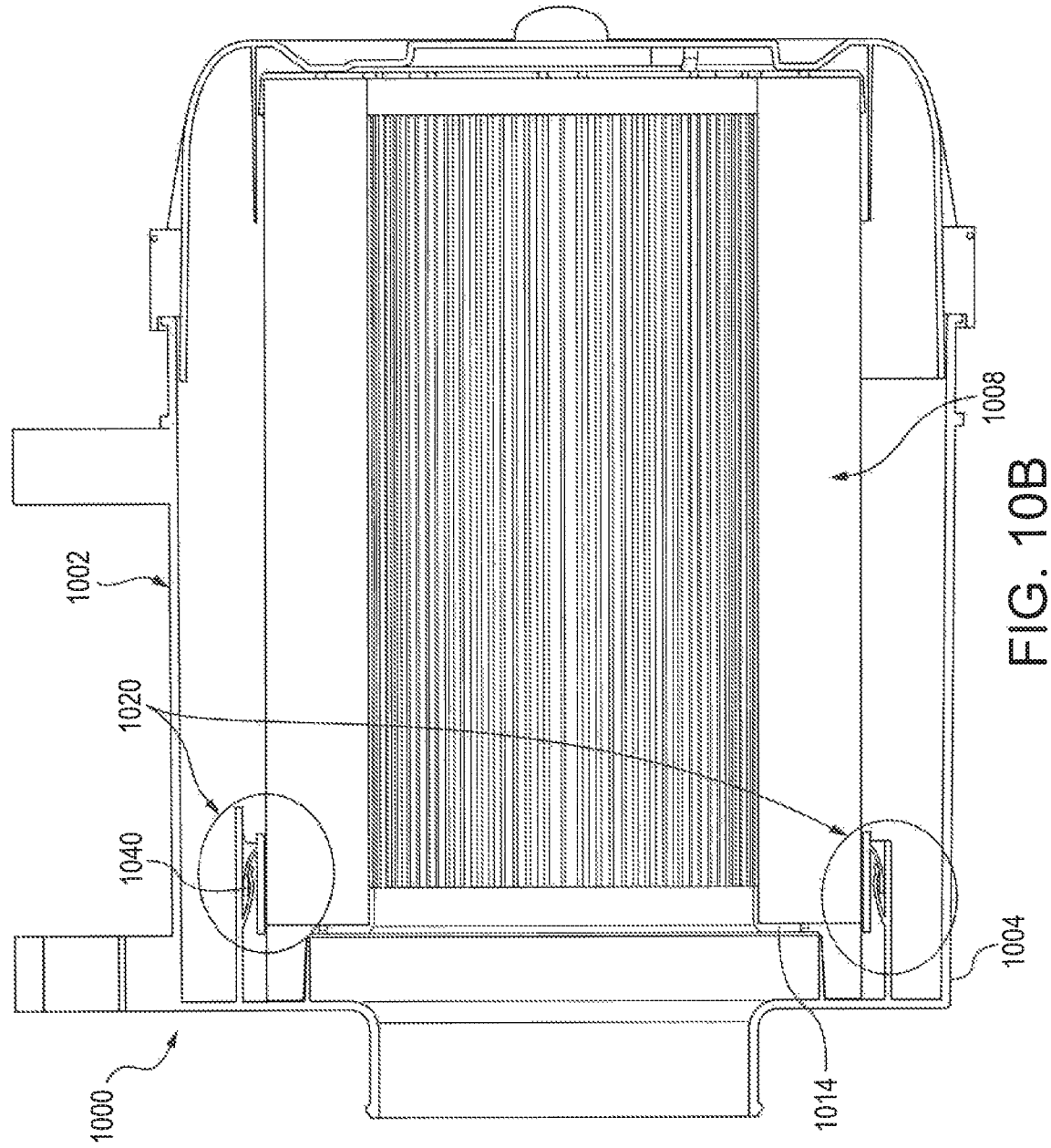

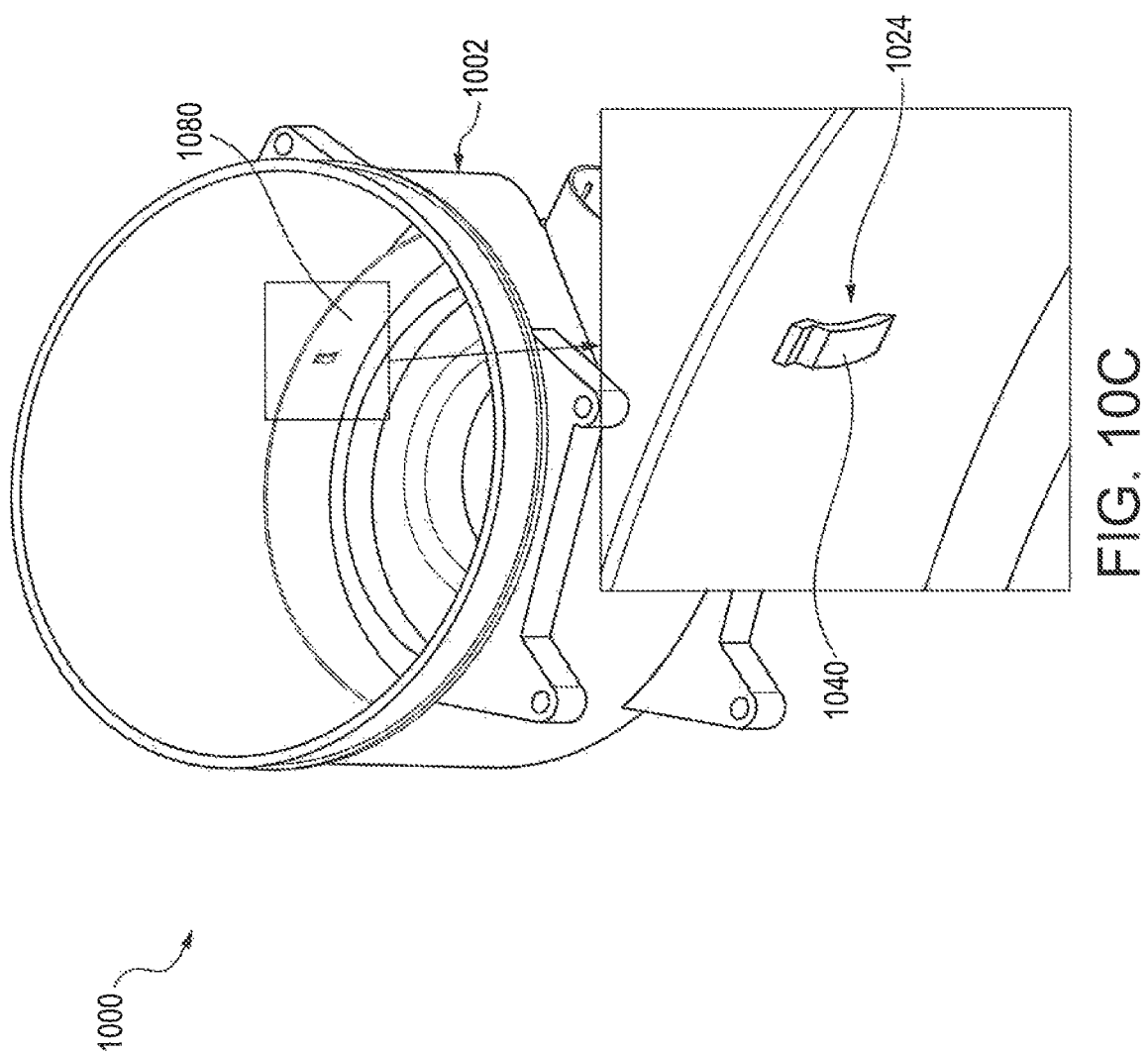

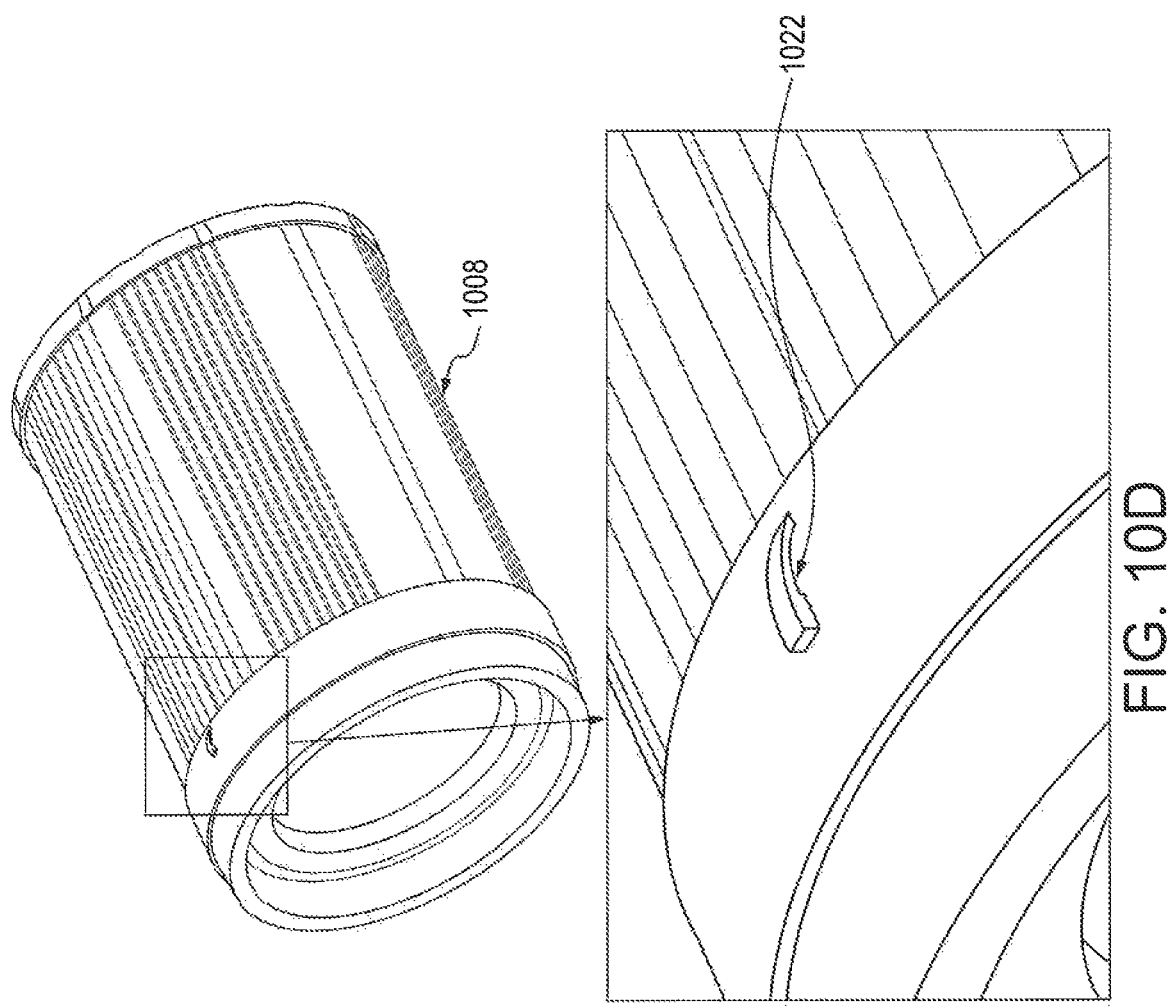

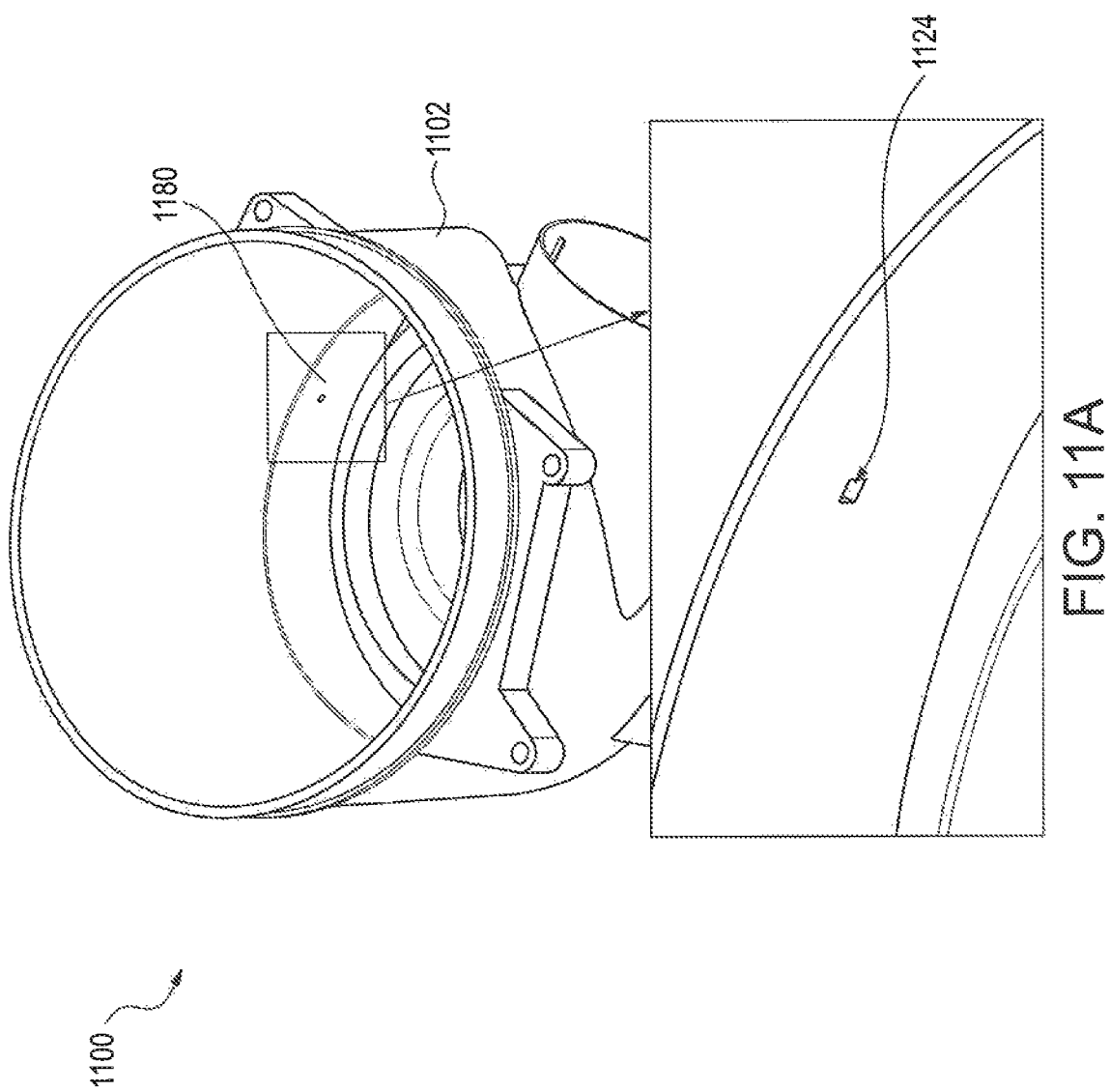

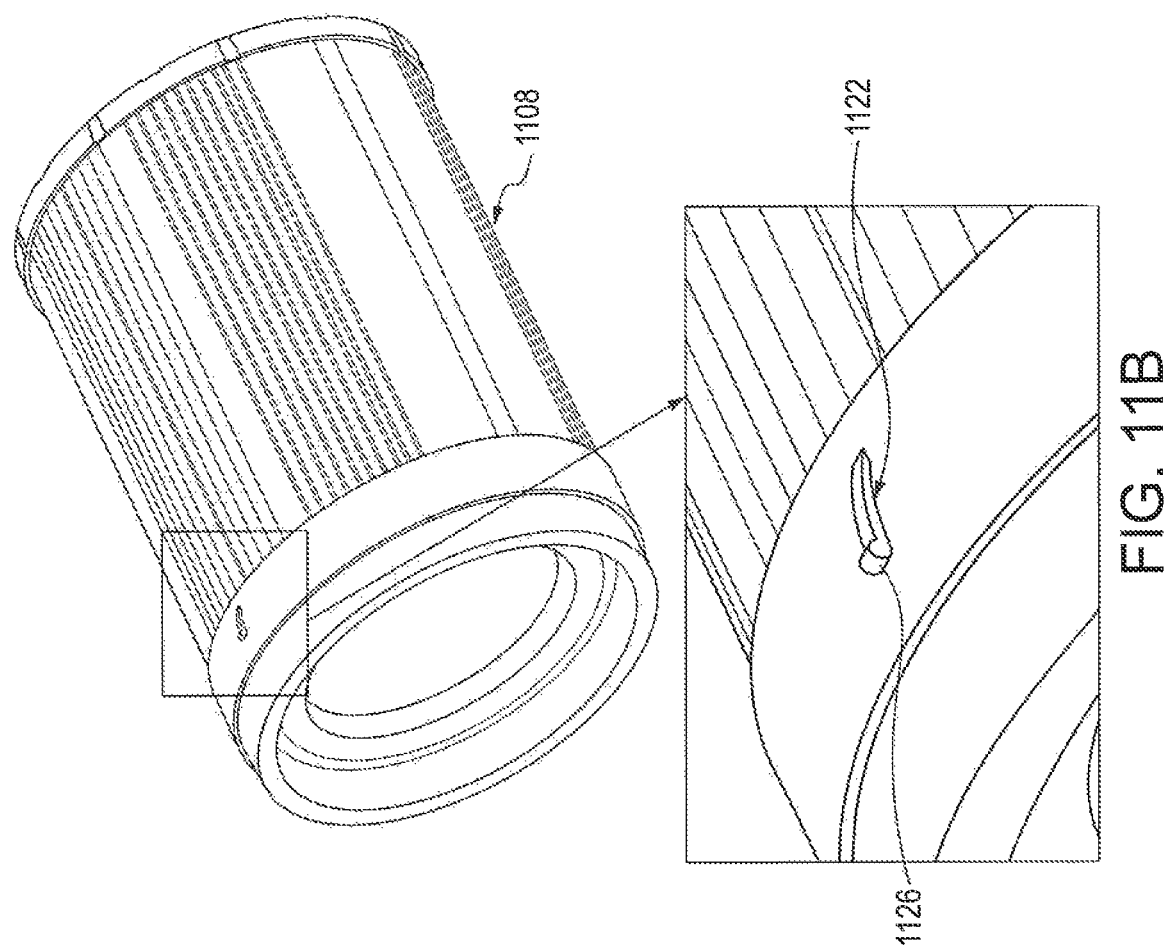

SAFETY FILTER SNAP FIT SYSTEM

CROSS-REFERENCE TO RELATED APPLICATIONS

The present application claims priority to U.S. Provisional Patent Application No. 62/721,049, filed Aug. 22, 2018 and the contents of which are incorporated herein by reference.

TECHNICAL FIELD

The present application relates to filter elements.

BACKGROUND

Internal combustion engines generally combust a mixture of fuel (e.g., gasoline, diesel, natural gas, etc.) and air. Prior to entering the engine, the intake air is typically passed through a filtration system to remove contaminants (e.g., dust, water, oil, etc.) from the intake air. The filtration system includes a filter element having filter media. As the air passes through the filter media of the filter element, the filter media removes at least a portion of the contaminants in the air thereby preventing unwanted contaminants from entering the internal combustion engine. Panel-type air filter elements are often used in air filtration systems for automotive applications. The panel-type air filter elements typically comprise pleated filter media arranged in a panel. In some filter elements, two panels are positioned in a V-shape and air to be filtered flows into the V-shape, through the panels, and out of the filter element in an inside-out manner.

Filter elements often include a seal member that is compressed against a component of the filtration system housing or another portion of the filtration system. The seal member forms a seal between the filtration system housing and the filter element, thereby preventing fluid from bypassing the filter element (e.g., for air to bypass an air filter element or liquid to bypass a liquid filter element). If an improper filter element (i.e., a non-authorized or non-genuine filter element) is installed in a filtration system, or if the proper filter element is installed incorrectly, the seal member of the filter element may not form a proper seal, and fluid may bypass the filter element causing damage to downstream components.

SUMMARY

Various example embodiments relate to a latch element for use with a filter element. The latch element includes a first end and a second end spaced laterally from the first end. An engagement portion is disposed between the first end and the second end. The engagement portion is configured to engage a housing. A handle portion is adjacent to the second end. The handle portion is configured to engage the filter element and facilitate removal of the filter element.

Various example embodiments relate to a filtration system. The filtration system comprises a filter element, a filter housing, and a latch element. The filter element includes a filter element housing and filter media. The latch element includes a first end and a second end spaced laterally from the first end. An engagement portion is disposed between the first end and the second end. The engagement portion is configured to engage a housing. A handle portion is adjacent to the second end. The handle portion is configured to engage the filter element and facilitate removal of the filter element.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIG. 1C shows a cross-sectional view of a portion of the filtration system of FIG. 1B.

FIG. 2A shows a cross-sectional view of a portion of the filtration system with a latch element with a snap fit handle portion, according to an example embodiment.

FIG. 2B shows a pair of views of the latch element with a snap fit handle portion in a housing of the filtration system of FIG. 2A.

FIG. 2C shows a pair of views of a latch element in a housing of the filtration system of FIG. 2A, according to another example embodiment.

FIG. 3 shows a latch element with a snap fit handle portion according to an even further embodiment.

FIG. 4A shows a perspective view of a latch element with a snap fit handle portion, according to an example embodiment.

FIG. 4B shows a bottom view of the latch element with a snap fit handle portion of FIG. 4A in a housing.

FIG. 4D shows a cross-sectional view of the latch element with a snap fit handle portion and housing of FIG. 4B in a first position.

FIG. 4E shows a cross-sectional view of the latch element with a snap fit handle portion and housing of FIG. 4B in a second position.

FIG. 5A shows a cross-sectional view of a latch element with a snap fit handle portion with a long clip, according to an example embodiment.

FIG. 6A shows a cross-sectional view of a latch element with a snap fit handle portion with a short clip, according to an example embodiment.

FIG. 8C shows a perspective view of the filtration system with a latch element with a snap fit handle portion of FIG. 8A in a third position.

FIG. 8D shows a perspective view of the filtration system with a latch element with a snap fit handle portion of FIG. 8A in a fourth position.

FIG. 10A, shows a perspective view of a filtration system with a latch element with a snap fit handle portion, according to another exemplary embodiment.

FIG. 10B shows a cross-sectional view of the filtration system with the latch element with a snap fit handle portion of FIG. 10A.

FIG. 10C shows a perspective view of a housing of the filtration system with the latch element with a snap fit handle portion of FIG. 10A.

FIG. 10D shows a perspective view of a filter element of the filtration system with the latch element with a snap fit handle portion of FIG. 10A.

FIG. 11A shows a perspective view of a housing of a filtration system with the latch element with a snap fit handle portion, according to another example embodiment.

FIG. 11B shows a perspective view of a filter element that engages the housing of FIG. 11A, according to another example embodiment.

DETAILED DESCRIPTION

Referring to the figures generally, a latch element that is configured to engage a filter element to provide a poke yoke feature that requires the user (e.g., installing entity, operator, etc.) to ensure that the filter element is aligned properly before the filtration system can be used. In that way, the latch element provides a keying element to assist the user with fitting and installing the filter element properly within the filtration system. In some embodiments, the latch element may have an asymmetrical (e.g., nonsymmetrical) snap fit portion that can be configured to ensure that the filter element will only have one orientation when installed. Beneficially, the latch element may impede rotation of the filter element such that 180-degree rotation is prevented. In other embodiments, the latch element may prevent a cover of the filtration system from closing when the latch element, and therefore, the filter element, is not property secured in the filtration system. As will be appreciated, by providing the user with greater certainty that the filter element is properly installed, the user will save time previously spent checking to ensure that the filter element is properly fit and secured. Thus, the latch element may act as a keying element that can protect the engine in case of a vehicle or other device from running without a properly secured and installed filter element, such that a "safety filter element" is provided.

In some embodiments, the latch element is disposed along a housing that is configured to receive a filter element. The latch element may be configured to snap-fit the filter element within a frame (e.g., case, brace, etc.) of the housing. The latch element may be configured to provide a visual, acoustic, and/or haptic feedback to the user to identify when the filter element is properly installed and secured by the latch element within the housing. In some embodiments, the latch element is configured to provide a handle to allows the user to install the filter element into the proper, final position and to remove the filter element. In other embodiments, a handle element is separate from the latch element. The handle element (or in some embodiments, the latch element) may be configured to have the flexibility and movement with a shape complementary to the shape of the housing. The latch element and/or handle element may be configured to provide a poke yoke for a wide variety of filter elements associated with a wide variety of alignment notch locations and sizes.

Figure 1A:
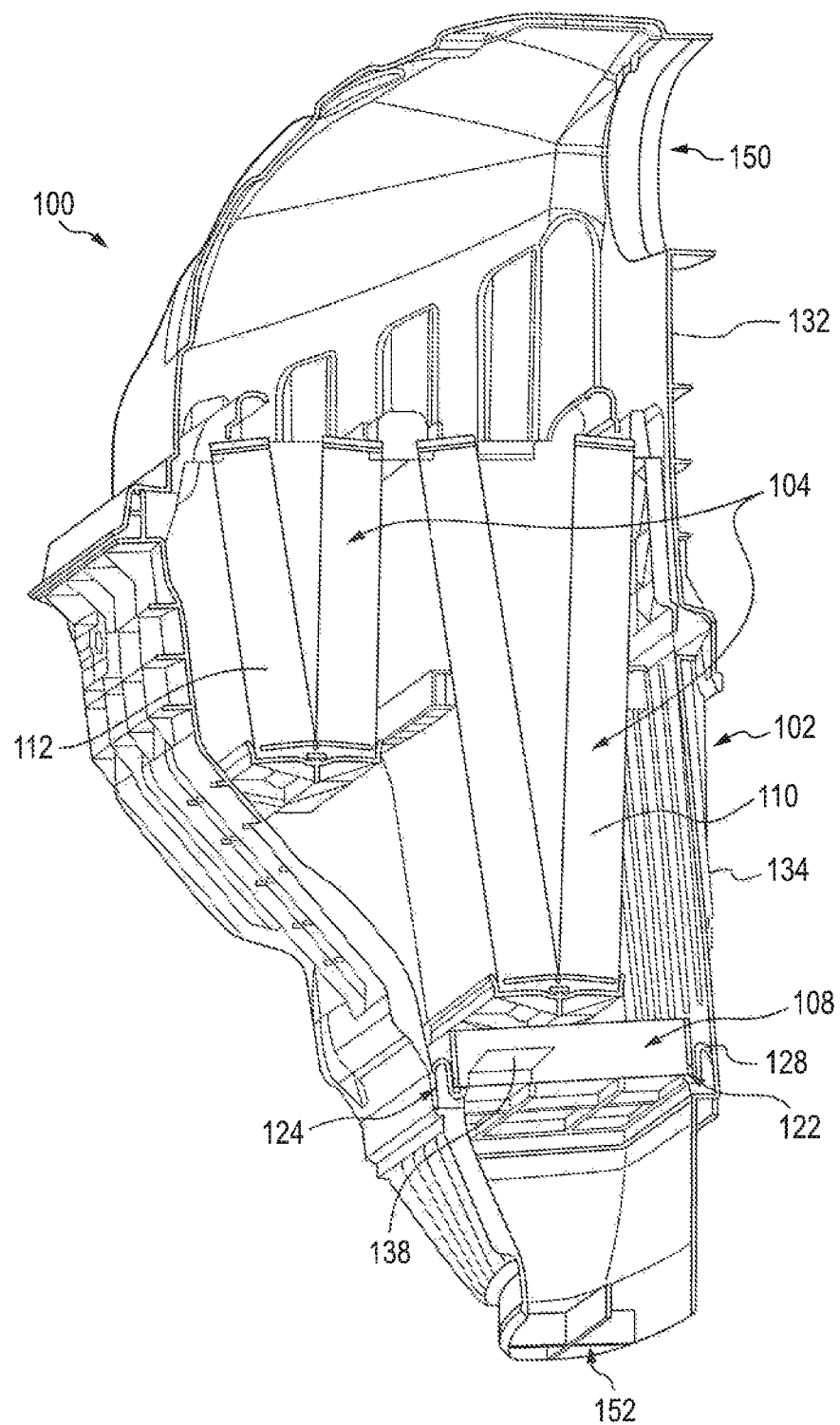
FIG. 1A shows a cross-sectional view of a filtration system, according to an example embodiment.

Referring to FIG. 1A, a cross-sectional view of a filtration system 100 is shown, according to an example embodiment. The filtration system includes a filter housing 102, a first filter element 104 (e.g., main filter element) and a secondary filter element 108 (e.g., a secondary, safety or security filter element) that is secured to the housing 102 with one or more clips in the form of a pair of latch elements: a first latch element 122 and a second latch element 124. The filter housing 102 includes an upper housing portion 132 defining an inlet 150 and a lower housing portion 134 defining an outlet 152. The first filter element 104 includes a first filter media 110 and a second filter media 112 extending in the axial direction (e.g., direction from the upper housing portion 132 toward the lower housing portion 134). The secondary filter element 108 includes a secondary housing 128 and a secondary filter media 138 disposed within the secondary housing 128. A first latch element 122 and a second latch element 124 are configured to couple the secondary filter element 108 to an inner surface 180 of the filter housing 102 and configured to secure the secondary filter media 138 within the secondary housing 128. In some embodiments, the first latch element 122 and the second latch element 124 are coupled to the filter housing 102. In other embodiments, the first latch element 122 and the second latch element 124 are coupled to the secondary housing 128.

Figure 1B:
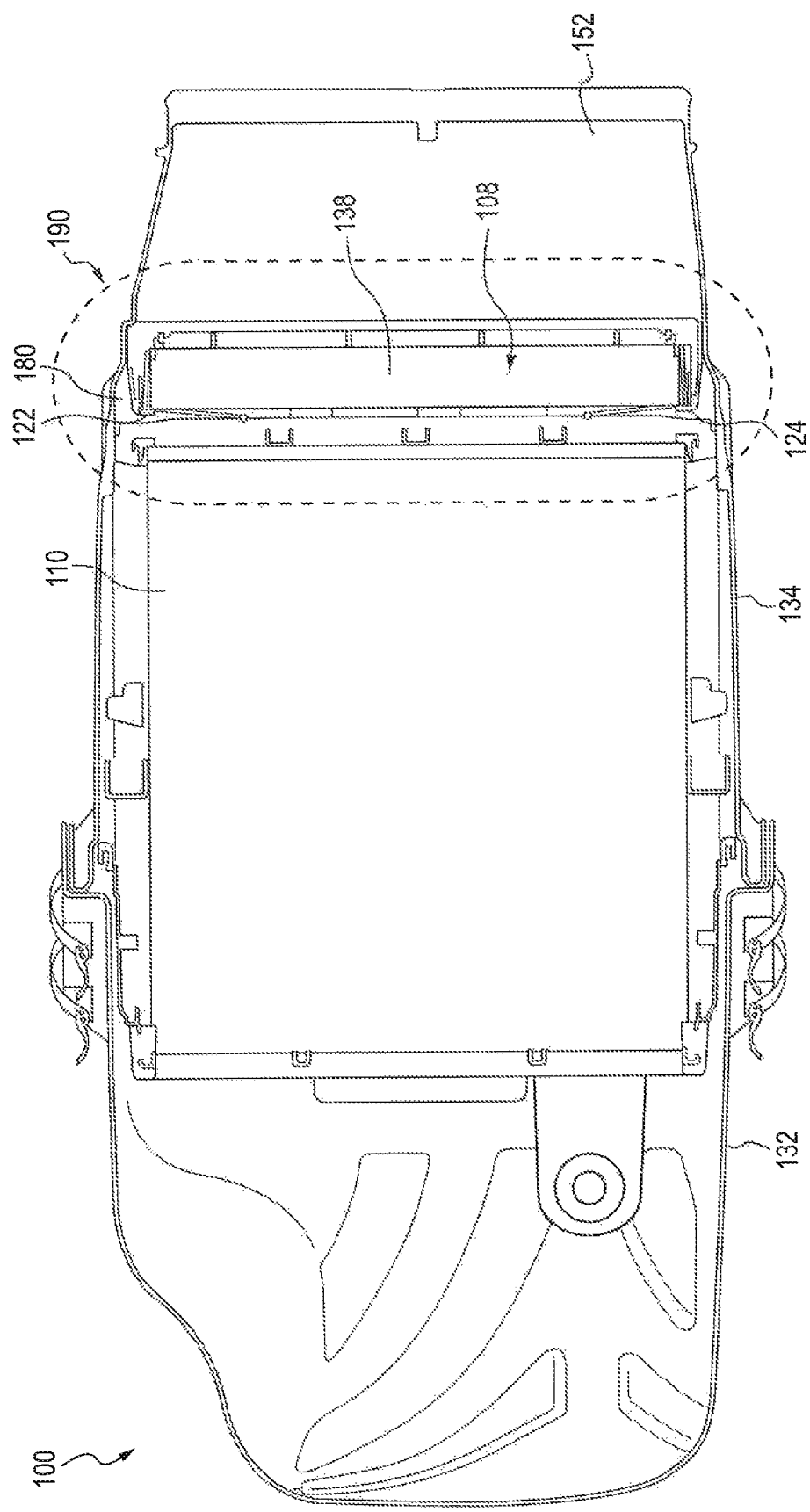
FIG. 1B shows a cross-sectional side view of the filtration system of FIG. 1A.

FIG. 1B shows a cross-sectional, side view of the filtration system 100 of FIG. 1A. FIG. 1C shows a cross-sectional view of a portion 190 of the filtration system of FIG. 1B where the first latch element 122 is securing the secondary filter element 108 within the filtration system 100. The first latch element 122 includes a clip portion 142 and a handle 140 extending from the clip portion 142. The handle 140 extends substantially laterally (e.g., perpendicular to the axial direction) adjacent the secondary filter media 138. The clip portion 142 is configured to engage an inner surface 180 of the lower housing portion 134 to secure the secondary filter element 108 within the filter housing 102.

Turning to FIG. 2A, a cross-sectional view of a portion of the filtration system 200 with a snap fit latch element 222 is shown, according to an example embodiment. The snap fit latch element 222 is similar to the first latch element 122 of the filtration system 100 of FIGS. 1A-1C. A difference between the snap fit latch element 222 and the first latch element 122 is the snap fit latch element 222 includes a flexible arm 220 along the clip portion 242. Accordingly, similar numbering will be used for similar features of the snap fit latch element 222 and the first latch element 122. The snap fit latch element 222 may be configured to engage the secondary filter element 108 in a location similar to the location of the clips (e.g., latch elements) of FIG. 1A. The snap fit latch element 222 provides additional snap-fit to the filter housing 102. The snap fit latch element 222 may be undercut in the filter housing 102 to properly engage the secondary filter element 108 within the filter housing 102. In the first position 250, the flexible arm 220 of clip portion 242 is curved and not deformed to fit within an inner surface 180 of the lower housing portion 134. The snap fit latch element 222 includes a curved portion 210 between the handle portion 240 and the clip portion 242. In the second position 252, the flexible arm 220 is disposed within the inner surface 180 of the lower housing portion 134 such that the flexible arm 220 is deformed with a plurality of detents 228 to couple the snap fit latch element 222 with the filter housing 102.

FIG. 2B is a pair of views of the snap fit latch element 222 of FIG. 2A. In FIG. 2B, the latch element includes an integral snap-fit portion that engages the filter element. The snap-fit clip portion 242 may be a pair of curved, flexible members (e.g., a first flexible arm 260 and a second flexible arm 262) with a u-cut portion 270 (e.g., gap) defined between the first flexible arm 260 and the second flexible arm 262. In other embodiments, the snap fit latch element 222 is integrally formed along the housing. FIG. 2C is a pair of views of the first latch element 122 of FIG. 1C. FIG. 2C does not include an integral snap-fit clip portion 242.

FIG. 3 shows the snap fit latch element 222 of FIG. 2A, with a snap fit handle clip portion 242 integrally formed with the inner surface 180 of the lower housing portion 134, according to an even further embodiment. The snap fit latch element 222 includes a handle portion 240, a primary curved portion 210, a snap-fit portion on the first flexible arm 260 and the second flexible arm 262 that define a u-cut portion 270, and a ramp portion 272. The ramp portion 272 may be a lead-in ramp with a similar angle to the as an angle formed between the snap fit latch element 222 and the filter housing 102. In some embodiments, the angle is approximately 20-degrees. In other embodiments, the angle is no greater than 25-degrees. The u-cut portion 270 may be spaced, for example 0.5 mm from the housing. A bend radius may be formed between the primary portion and the handle portion. A protruding member 302 may extend horizontally away from the handle portion 240 and is configured to couple the snap fit latch element 222 to the secondary housing 128.

Turning to FIGS. 4A and 4B, perspective views of a pair of latch elements 420 with a snap fit handle portion 440 are shown, according to an example embodiment. The pair of latch elements 420 include a first latch element 422 and a second latch element 424. The first latch element 422 and the second latch element 424 are similar to the first latch element 122 of the filtration system 100 of FIGS. 1A-1C. A difference between the pair of latch elements 420 and the first latch element 122 is the pair of latch elements 420 includes a substantially perpendicular clip portion 442. Accordingly, similar numbering will be used for similar features of the pair of latch elements 420 and the first latch element 122. Each latch element (e.g., first latch element 422 and second latch element 424) of the pair of latch elements 420 has an engagement portion 402 engaged onto a frame 428 of the secondary housing 128, a first end extending past the frame that defines the clip portion 442, and a second end that extends from the first end into a central opening of the secondary housing 128 that defines the handle portion 440. The frame 428 is configured to receive a secondary filter media 138. The frame 428 may be rectangular in shape and include the first latch element 422 along a center of a first length of the frame and the second latch element 424 along a center of the second length of the frame. The frame 428 defines central opening that is configured to receive the secondary filter media 138. In some arrangements, the frame 428 is made from injection molded plastic. The frame 428 may include stabilizers that extend from the frame away from the central opening and may be configured to interact with a filter housing 102 to help stabilize the secondary filter element 108 within the filter housing 102. In some arrangements, the frame 428 may include a plurality of flow passages extending through the frame 428 thereby reducing the amount of area of the filter media packs masked off by the frame 428. The central opening may be substantially rectangular in shape. The central opening is defined by a length, a width, and a height. In some arrangements, the length is larger than the width. The width of the central opening varies across the length. In some arrangements, the width is the smallest at the center of the length. The narrowing width from an edge of the central opening to the center of the central opening provides a contact zone that contacts and supports the filter media packs of the filter element.

Figure 4C:
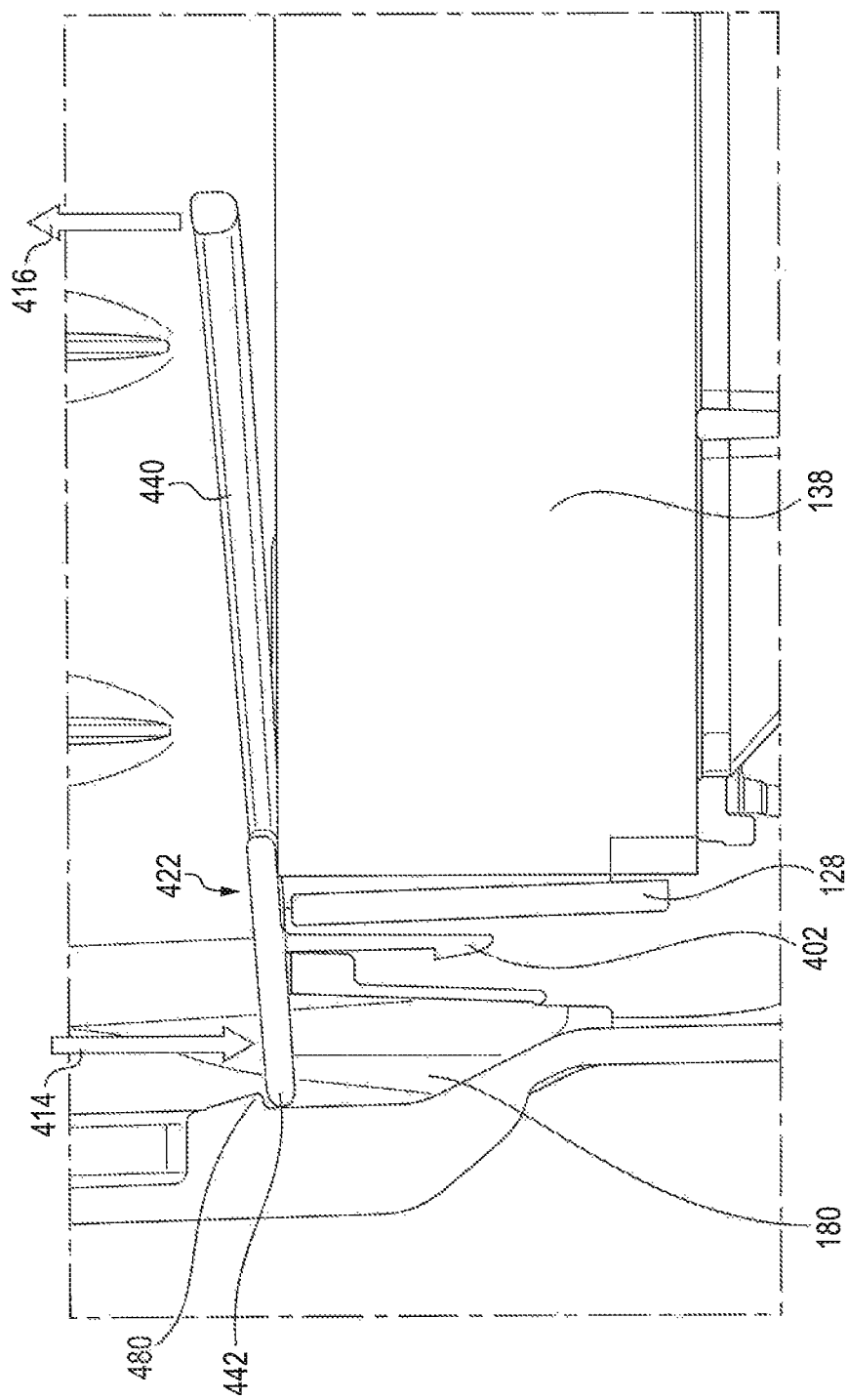
FIG. 4C shows a cross-sectional view of the latch element with a snap fit handle portion and housing of FIG. 4B.

Each latch element in the pair of latch elements 420 may be snap fit within the filter housing 102 on two ends of the filter housing 102. Turning to FIGS. 4C-4E, cross-sectional views of the first latch element 422 with a snap fit handle portion 440 and secondary housing 128 of FIG. 4B are shown. The first end of the clip portion 442 of the latch end may receive a downward axial force 414 to mount or disengage the first latch element 422 and a detent portion 480 on the inner surface 180 to couple the secondary filter element 108 and the filter housing 102. The second end may be axially displaced upward by an upward axial force 416 (e.g., substantially upward axial direction) when the first end is moved axially downward. The second end may rotate about the engagement portion 402 of the first latch element 422. The second end may be pulled to remove the secondary filter element 108. The handle portion 440 of the latch element may be overmolded in polyurethane to allow flexibility during clipping. The first latch element 422 may be a handle with a male clip portion.

Figure 5B:
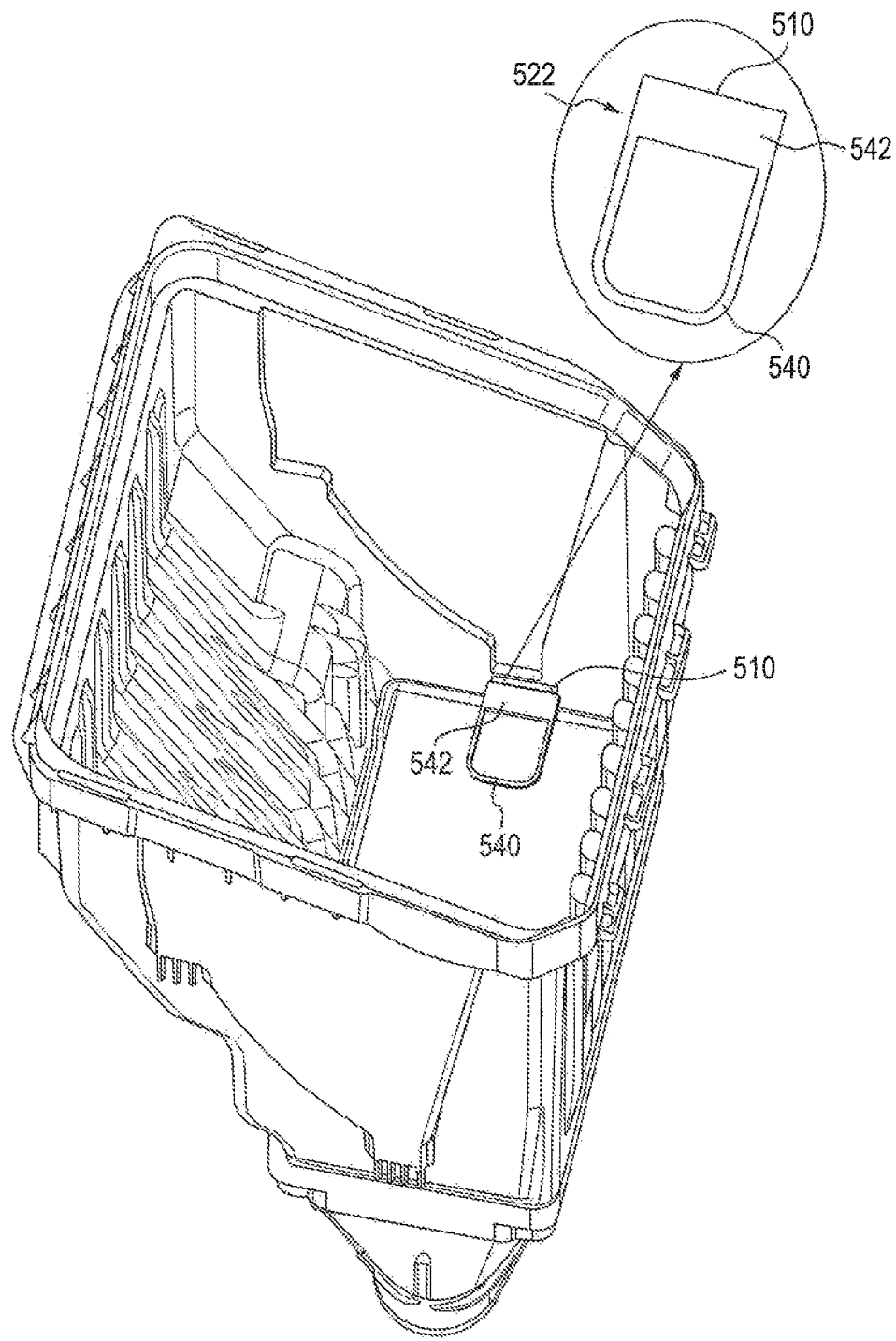
FIG. 5B shows a perspective view of the latch element with a snap fit handle portion with the long clip of FIG. 5A, according to an example embodiment.

FIG. 5A shows a cross-sectional view of a latch element 522 with a snap fit handle portion 540 with a long clip portion 542, according to an example embodiment. The latch element 522 is similar to the first latch element 422 of the filtration system 100 of FIGS. 4A-4E. A difference between the latch element 522 and the first latch element 422 is the latch element 522 includes a horizontal clip end 510 (e.g., substantially parallel to the filter media end) configured to couple the latch element 522 with the inner surface 180 of the filter housing 102. Accordingly, similar numbering will be used for similar features of the latch element 522 and the first latch element 422. The latch element 522 is a long clip latch element and is configured to engage the secondary filter element 108. FIG. 5B shows a perspective view of the latch element 522 with a snap fit handle portion 540 with the long clip portion 542 of FIG. 5A without the secondary filter element 108, according to an example embodiment.

Figure 6B:
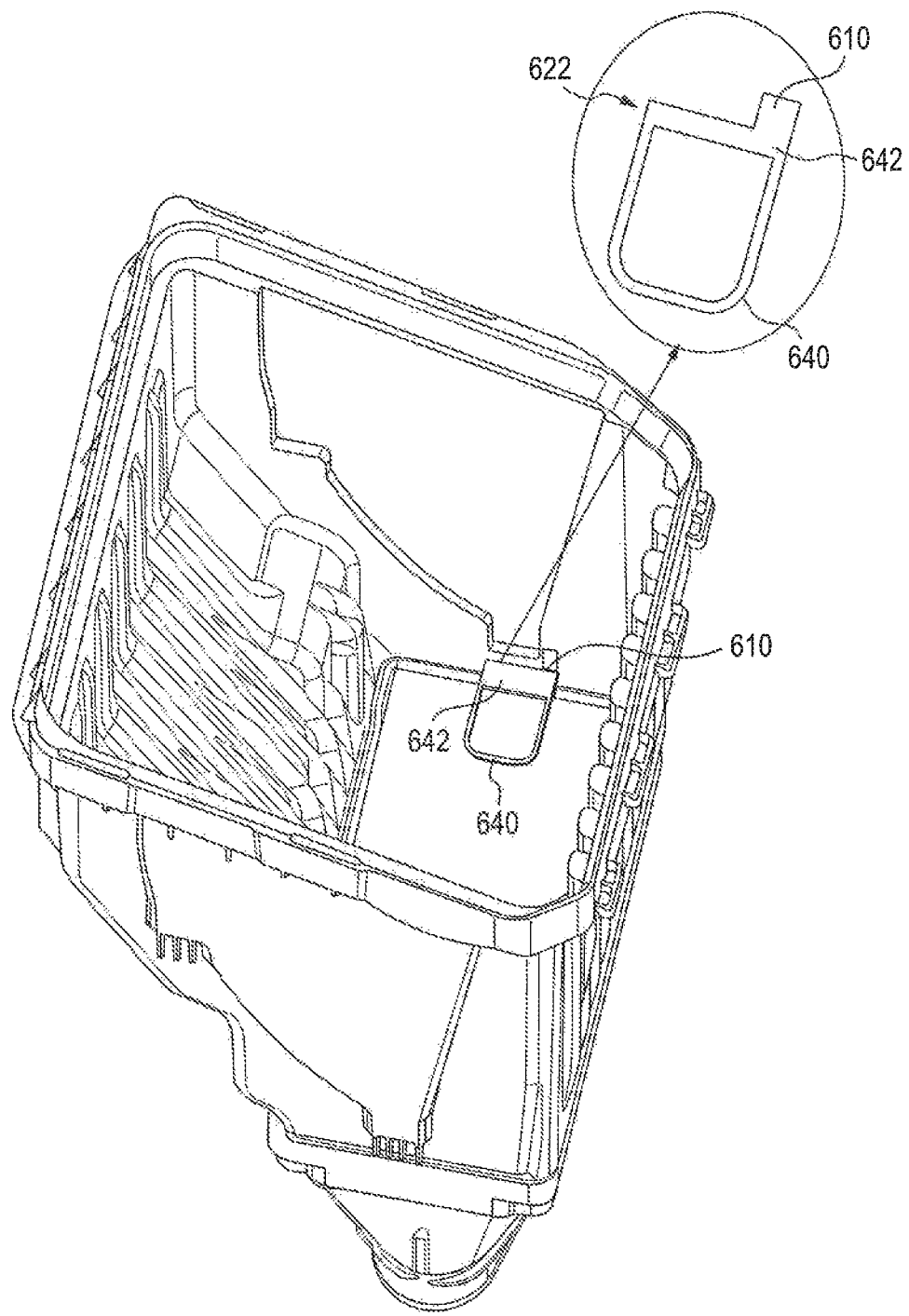
FIG. 6B shows a perspective view of the latch element with a snap fit handle portion with the short clip of FIG. 6A, according to an example embodiment.
Figure 6C:
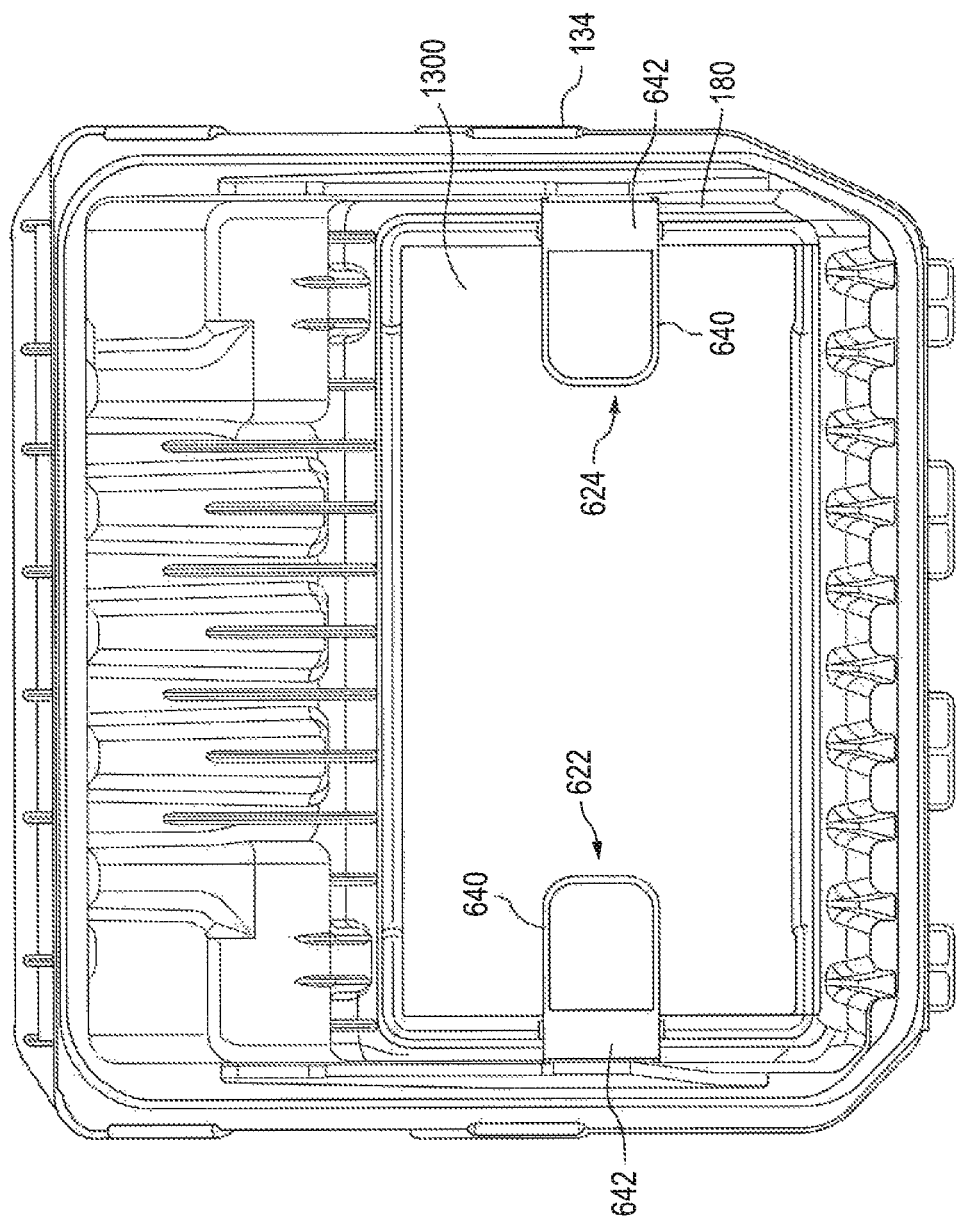
FIG. 6C shows a bottom view of the latch element with a snap fit handle portion with the short clip of FIG. 6A, according to an example embodiment.

FIG. 6A shows a cross-sectional view of a latch element 622 with a snap fit handle portion 640 with a short clip portion 642, according to an example embodiment. The latch element 622 is similar to the latch element 522 of FIGS. 5A-5B. A difference between the latch element 622 and the latch element 522 is the latch element 622 includes a vertical clip end 610 (e.g., substantially perpendicular to the filter media end) configured to couple the latch element 622 with the inner surface 180 of the filter housing 102. Accordingly, similar numbering will be used for similar features of the latch element 622 and the latch element 522. The latch element 622 comprises a short clip latch element and is configured to engage the secondary filter element 108. FIG. 6B shows a perspective view of the latch element 622 with a snap fit handle portion 640 with the short clip portion 642 of FIG. 6A without a secondary filter element 108, according to an example embodiment. FIG. 6C shows a bottom perspective view of a pair of latch elements 620, including the first latch element 622 and a second latch element 624, with a snap fit handle portion 640 with the short clip portion 642 of FIG. 6A. In some embodiments, a poke-yoke feature may be added to the first end of the latch element 622 to mount the secondary filter element 108 at the same location after servicing the filtration system.

Figure 7A:
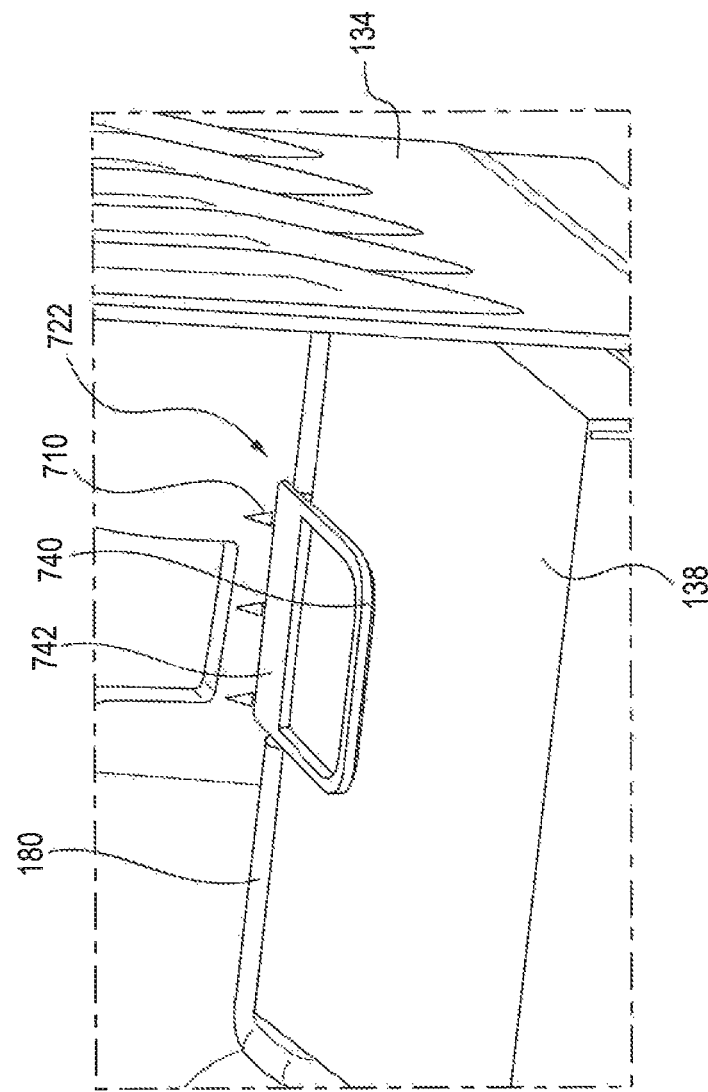
FIG. 7A shows a cross-sectional view of a latch element with a snap fit handle portion with a plurality of short clips, according to an example embodiment.
Figure 7B:
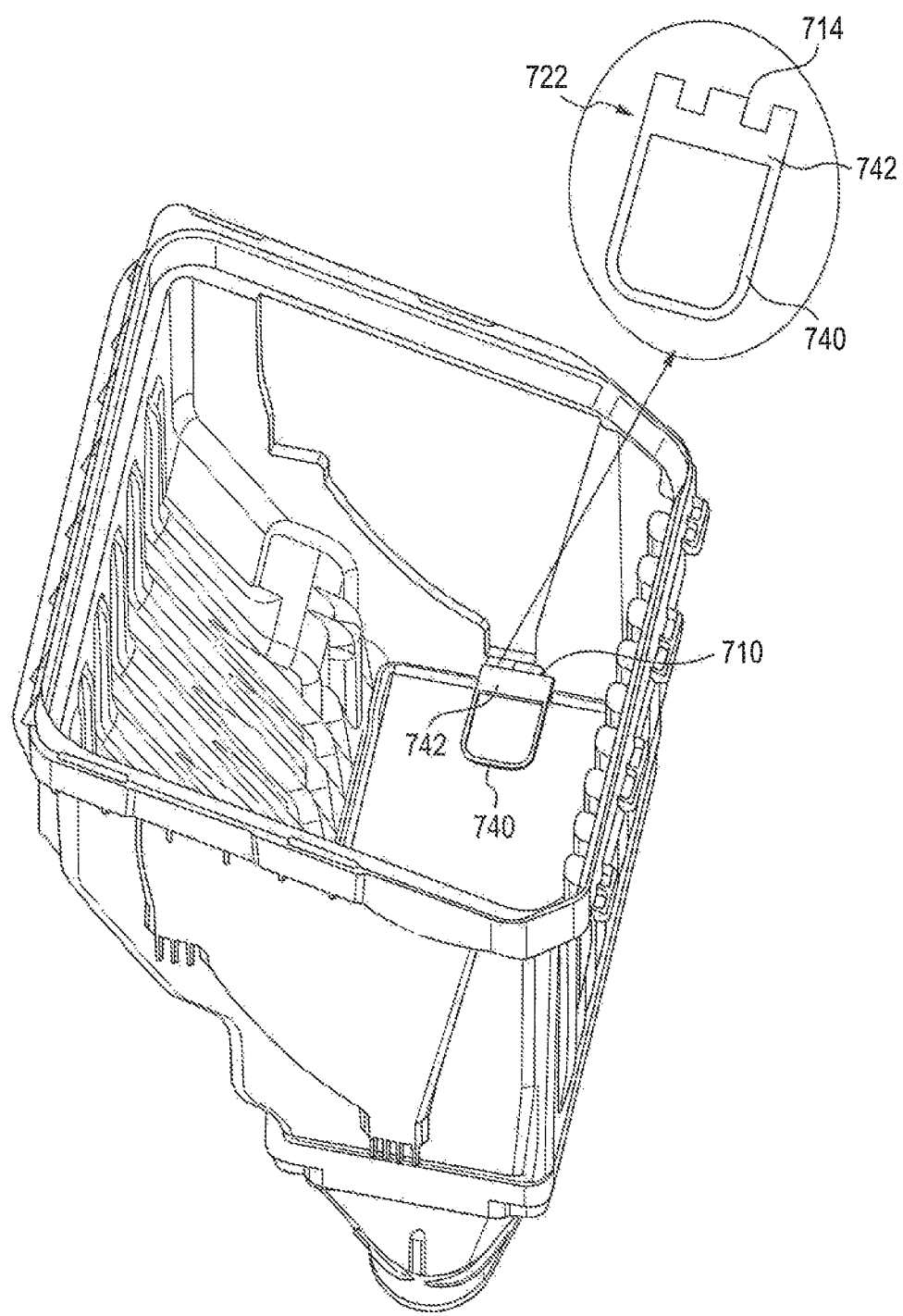
FIG. 7B shows a perspective view of the latch element with a snap fit handle portion with the plurality of short clips of FIG. 7A, according to an example embodiment.
Figure 7C:
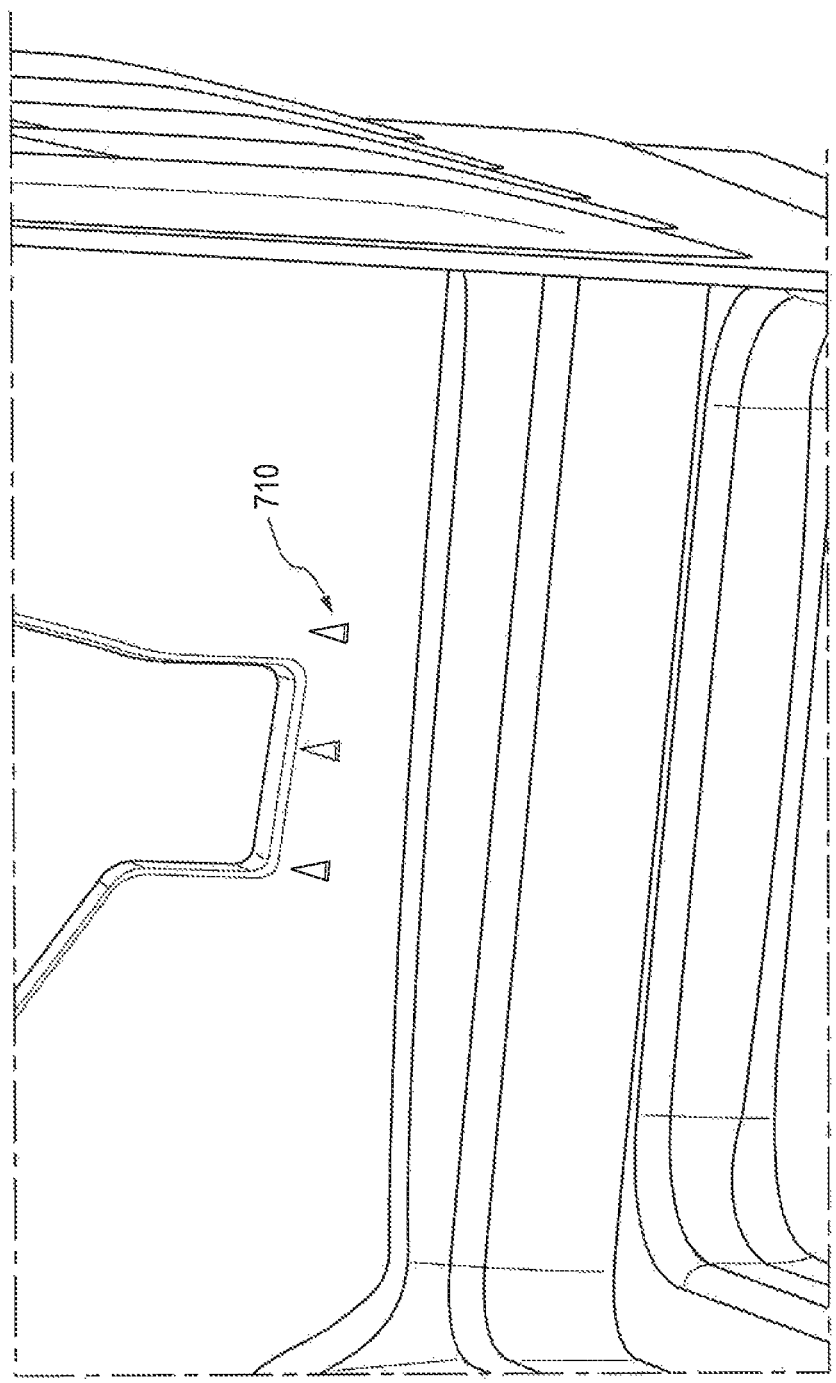
FIG. 7C shows a perspective view of a portion of the housing that engages the plurality of short clips of FIG. 7A, according to an example embodiment.

FIG. 7A shows a cross-sectional view of a latch element 722 with a snap fit handle portion with a plurality of short clips (e.g., clip portions 710), according to an example embodiment. The latch element 722 is similar to the latch element 522 of FIGS. 5A-5B. A difference between the latch element 722 and the latch element 522 is the latch element 722 includes a plurality of short clip portions 710 configured to couple the latch element 722 with the inner surface 180 of the filter housing 102. Accordingly, similar numbering will be used for similar features of the latch element 722 and the latch element 522. As shown in FIG. 7B, the latch element 722 includes three clip portions of the plurality of clip portions 710 and two clip openings 714 (e.g., rectangular opening) formed in the first end of the latch element 722 (although other numbers of clip portions and clip openings are possible). FIG. 7C shows a perspective view of a portion of the housing that includes three clip engagement portions of the plurality of clip portions 710 that engage the plurality of short clip openings 714 of the latch element 722.

Figure 8B:
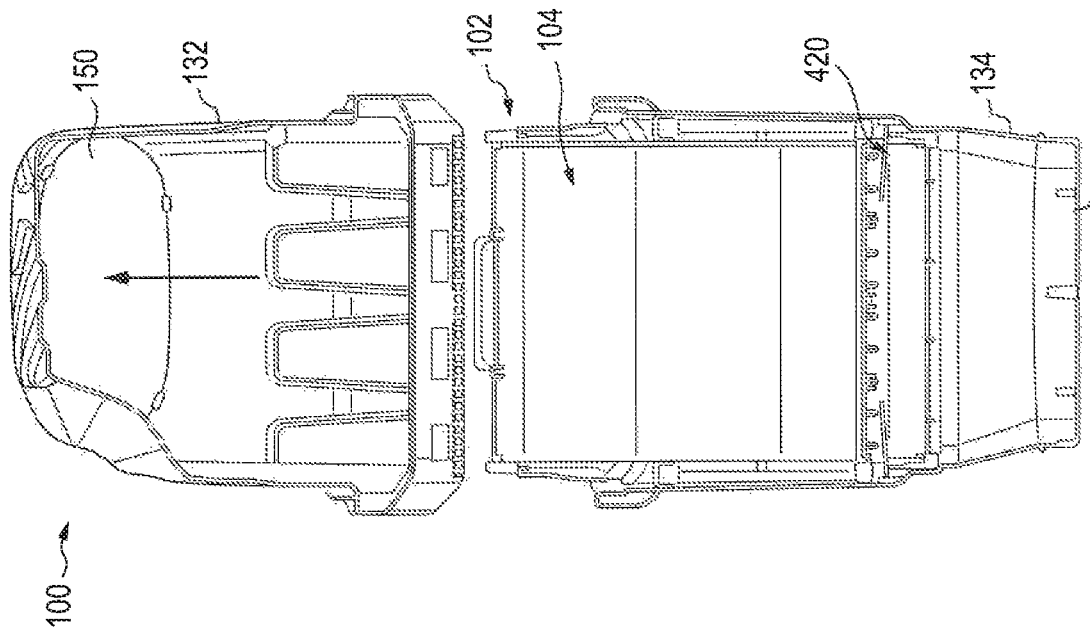
FIG. 8B shows a perspective view of the filtration system with a latch element with a snap fit handle portion of FIG. 8A in a second position.
Figure 8A:
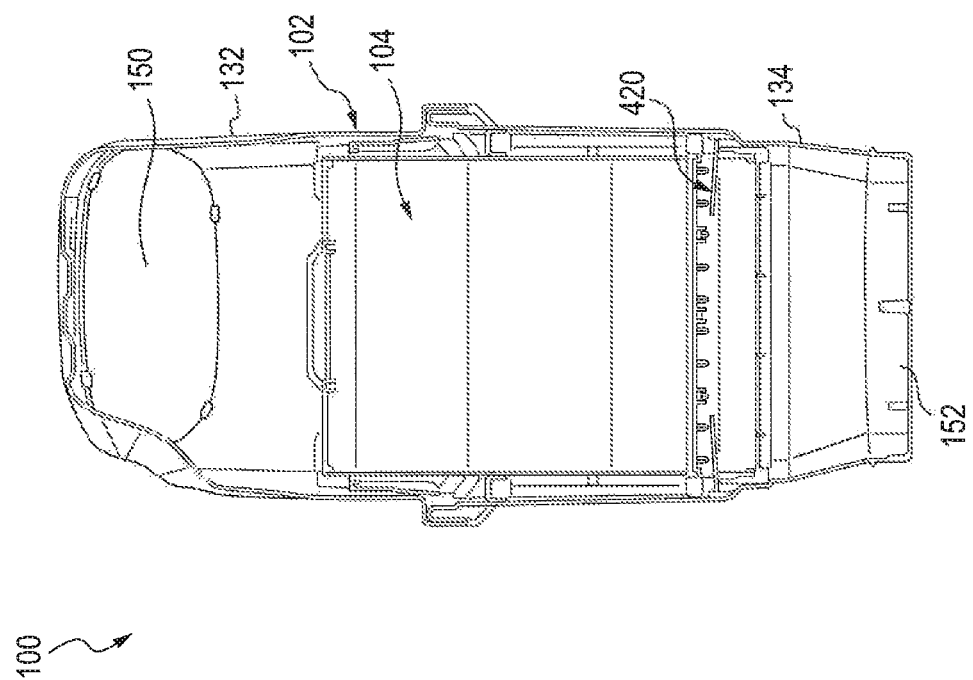
FIG. 8A shows a perspective view of a filtration system with a latch element with a snap fit handle portion in a first position, according to an example embodiment.
Figure 8E:
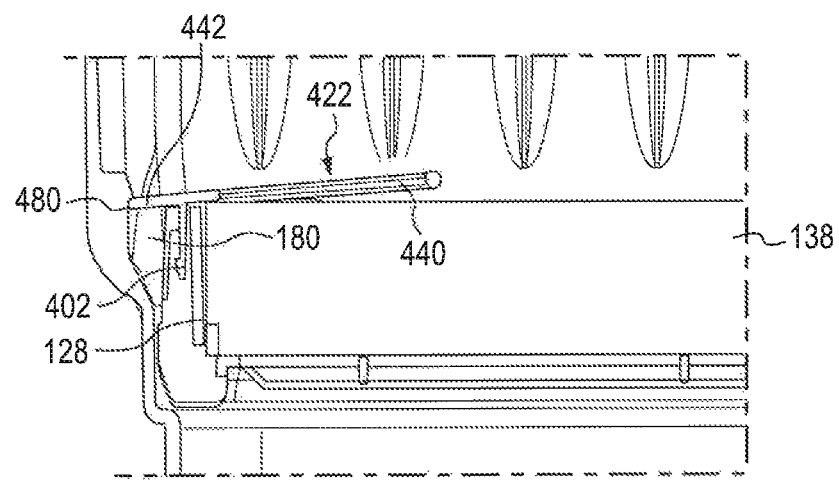
FIG. 8E shows a perspective view of the filtration system with a latch element with a snap fit handle portion of FIG. 8A in a fifth position.
Figure 8F:
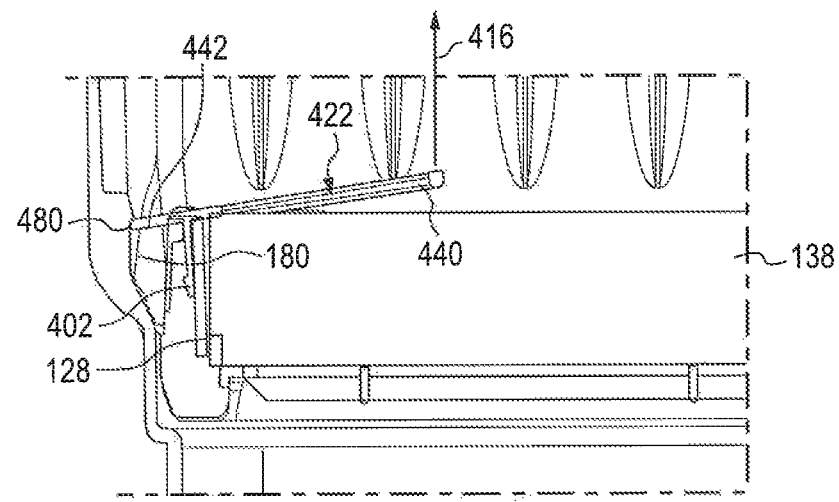
FIG. 8F shows a perspective view of the filtration system with a latch element with a snap fit handle portion of FIG. 8A in a sixth position.
Figure 8G:
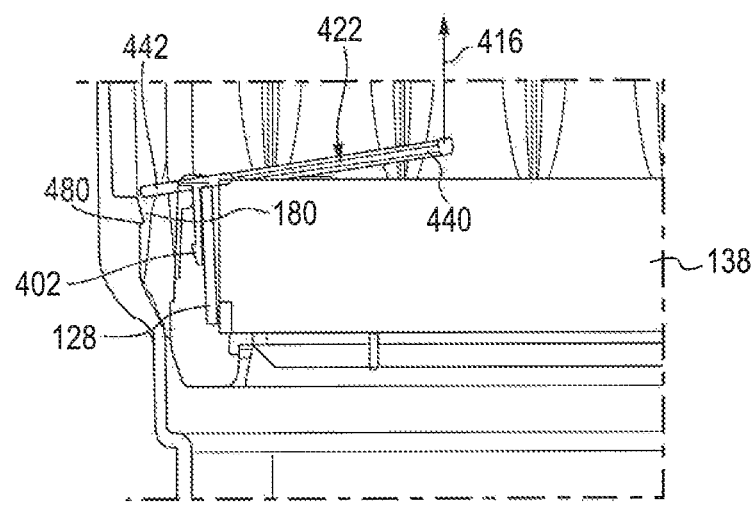
FIG. 8G shows a perspective view of the filtration system with a latch element with a snap fit handle portion of FIG. 8A in a seventh position.

FIGS. 8A-8G show the removal of a secondary filter element 108 from the filtration system 100 including a latch element 422 through seven positions. The removal of secondary filter element 108 includes removal of an upper housing portion 132 (e.g., housing cover) as shown in FIG. 8B, removal of a first filter element 104 (e.g., main filter element) as shown in FIG. 8C, and removal of a secondary filter element 108 as shown in FIGS. 8D-8G. The removal of the secondary filter element 108 includes the user pulling the handle portion 440 along an upward axial force 416 of a second end of the latch element 422 and removal of the secondary filter element 108 as shown in the portion 850 of the filtration system 100 of FIGS. 8E-8G.

Figure 9A:
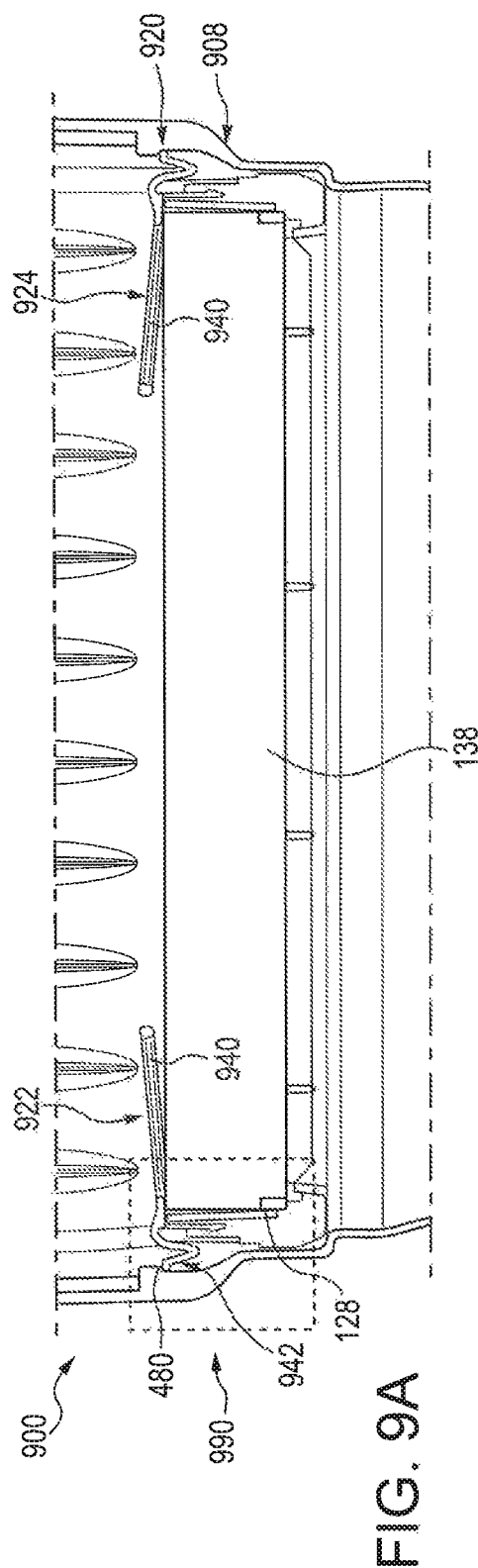
FIG. 9A shows a cross-sectional side view of a filtration system with a latch element that includes a v-shaped clip portion, according to an example embodiment.

FIGS. 9A-9G show a filtration system 900 with a pair of latch elements 920 with a v-shaped clip portion 942, according to an example embodiment. The pair of latch elements 920 are similar to the pair of latch elements 420 of FIGS. 4A-4E. A difference between the pair of latch elements 920 and the pair of latch elements 420 is the pair of latch elements 920 include a v-shaped clip portion 942. Accordingly, similar numbering will be used for similar features of the pair of latch elements 920 and the pair of latch elements 420. As shown in FIG. 9A, the pair of latch elements 920 includes a first latch element 922 and a second latch element 924 disposed opposite of the first latch element 922 (e.g., mirrored about the axial axis). Each of the first latch element 922 and the second latch element 924 includes a handle portion 940, a clip portion 942, the engagement portion 402, and an engagement detent 902. The engagement portion 402 is a substantially axial protruding member configured to engage the secondary housing 128 and is configured to couple the latch element 420 to the secondary housing 128. The engagement detent 902 is formed along a bottom surface between the base portion 910 and clip portion 942 and is configured to receive a portion of the secondary housing 128 to couple the secondary housing 128 with the latch element 920. Generally, the clip portion 942 is pressed axially downward, flexing inward, past the detent portion 480 on the inner surface 180 to couple the secondary filter element 108 and the filter housing 102.

Figure 9B:
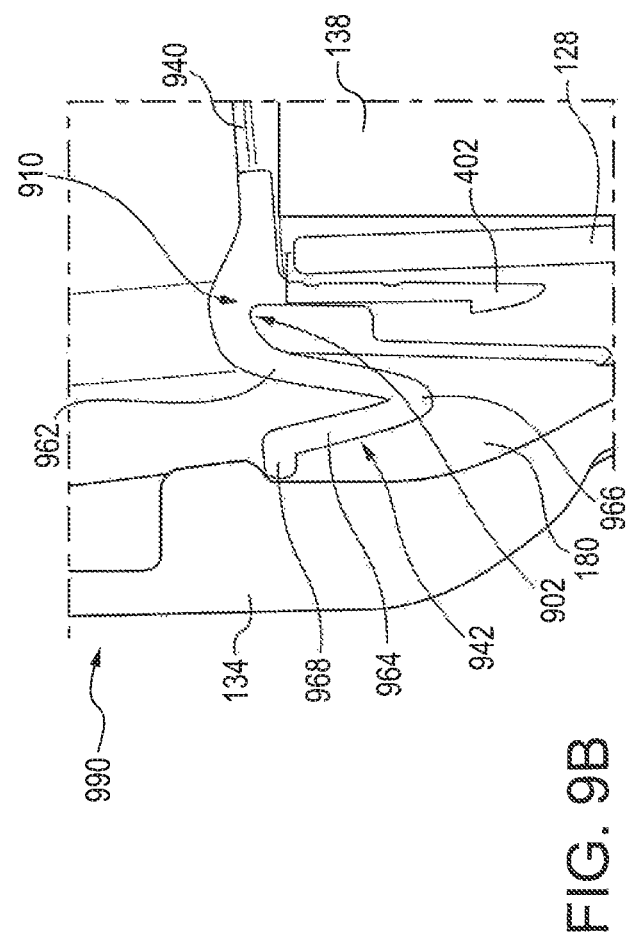
FIG. 9B shows a portion of the cross-sectional side view of the filtration system of FIG. 9A.

As shown in a portion 990 of the filtration system 900 in FIG. 9B, the clip portion 942 extends from the latch base portion 910 away from the handle portion 940 and toward the filter housing 102. The clip portion 942 includes a generally v-shaped clip with a first arm 962 extending downward and away from the base portion 910 toward a point portion 966 (e.g., the base of the "v" on the V-shape). A second arm 964 extends upward and away from the point portion 966 and the base portion 910 toward the protruding member 968. The protruding member 968 is configured to "clip" or snap-fit the clip portion 942 below the detent portion 480 on the inner surface 180 to couple the secondary filter element 108 and the filter housing 102. In some embodiments, the second arm 964 is configured to flex radially inward (e.g., toward the latch base portion 910) and return to an un-flexed state to allow the protruding member 968 to pass the detent portion 480. In some embodiments, both the second arm 964 and the first arm 962 are configured to flex radially inward (e.g., toward the latch base portion 910) and return to un-flexed states to allow the protruding member 968 to pass the detent portion 480. The clip portion 942 provides a compact, space-efficient mechanism to couple the secondary filter element 108 and the filter housing 102.

Figure 9C:
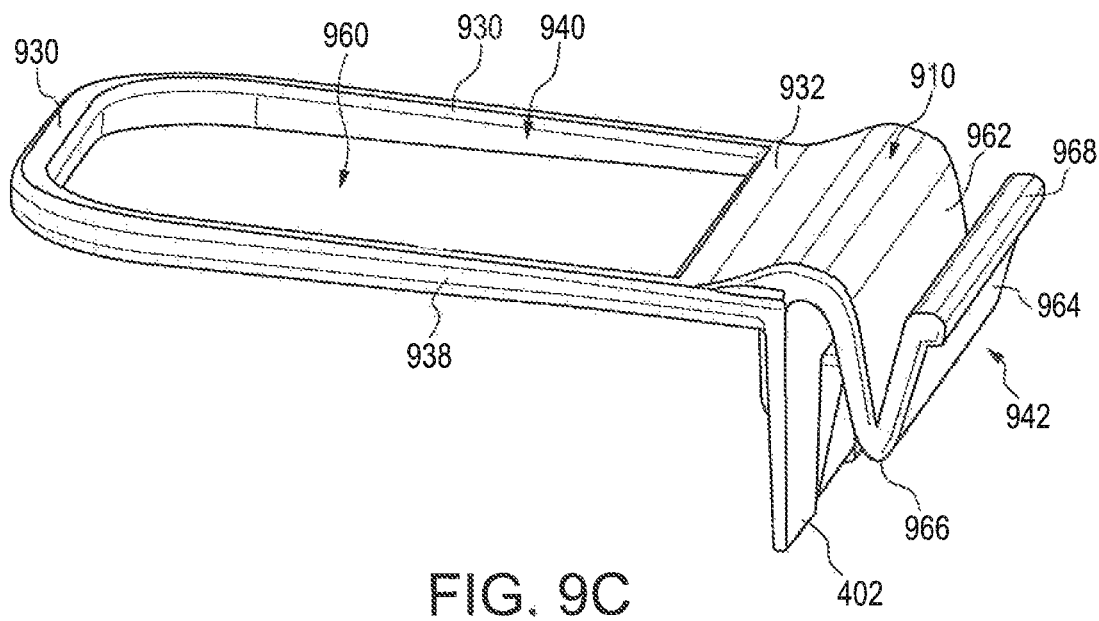
FIG. 9C shows a perspective view of the latch element that includes the v-shaped clip portion of the filtration system of FIG. 9A.
Figure 9D:
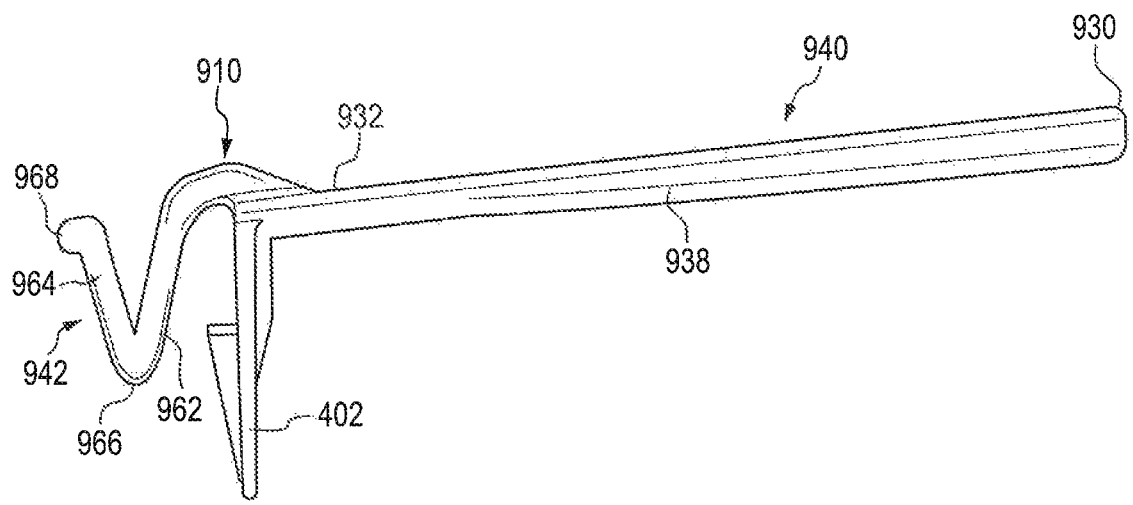
FIG. 9D shows a side view of the latch element that includes the v-shaped clip portion of the filtration system of FIG. 9A.

As shown in FIGS. 9C and 9D, the handle portion 940 includes a first handle end 932 adjacent the base portion 910 and a second handle end 934 disposed laterally away from the first handle end 932 (e.g., away from the base portion 910). A handle opening 960 is defined between the first handle end 932, the second handle end 934, and the handle sidewalls 938. As shown in FIG. 9C, the handle opening 960 is substantially rectangular and configured to minimize interference with the flow through the secondary filer media 138. In some embodiments, the handle portion 940 of the latch element 920 may be overmolded in polyurethane to allow flexibility during clipping. As shown in a portion 992 of the filtration system 900 in FIG. 9G, the clip portion 942 is engaged below the detent portion 480 of the housing 102.

Figure 9E:
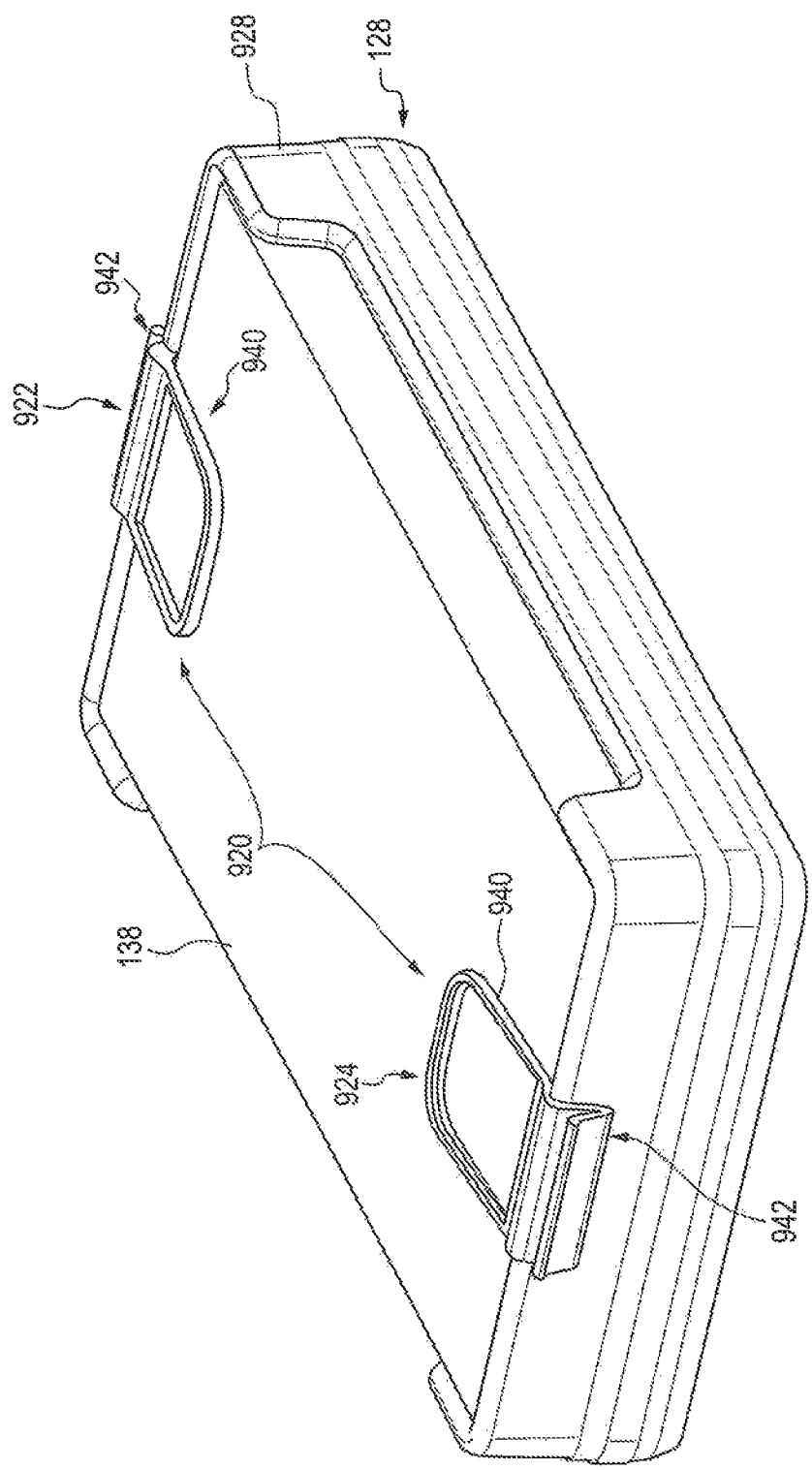
FIG. 9E shows a perspective view of secondary filter element with the latch element that includes the v-shaped clip portion of the filtration system of FIG. 9A.
Figure 9G:
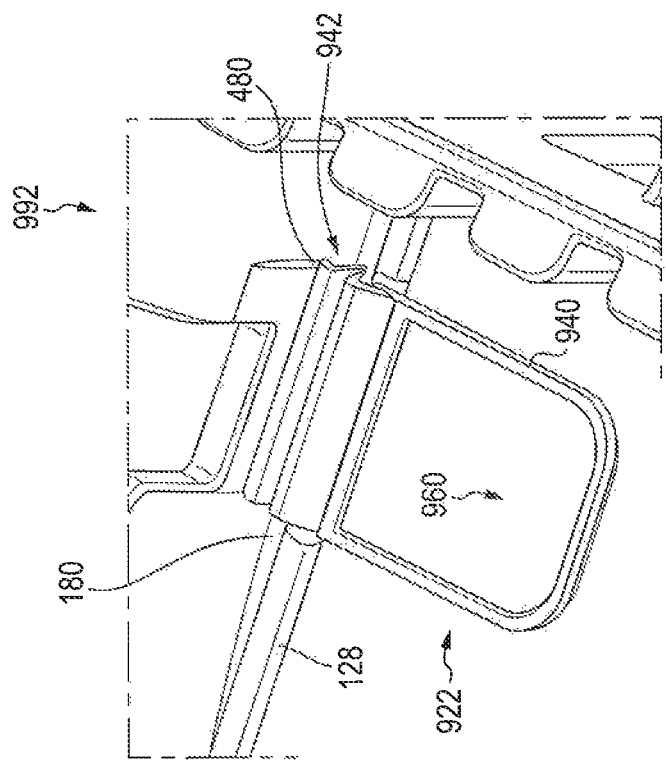
FIG. 9G shows a portion of the perspective view of the housing and latch element of the filtration system of FIG. 9F.
Figure 9F:
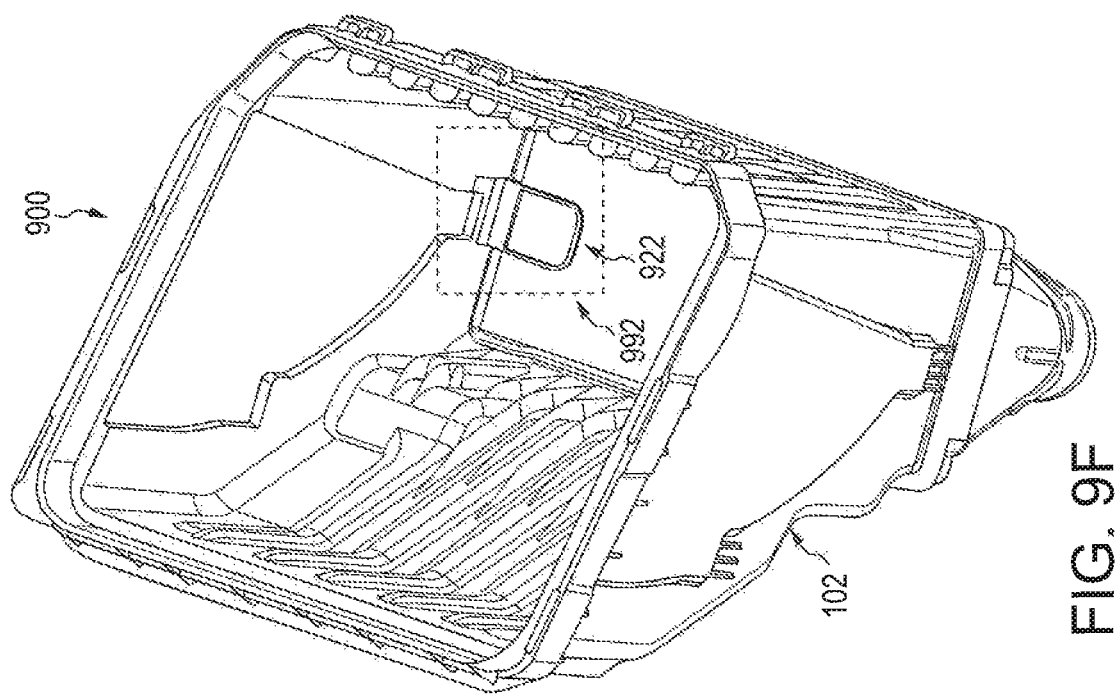
FIG. 9F shows a perspective view of the housing and latch element of the filtration system of FIG. 9A.

The frame 928 of FIG. 9E is configured to receive a secondary filter media 138. The frame 928 may be rectangular in shape and include the first latch element 922 along a center of a first length of the frame and the second latch element 924 along a center of the second length of the frame. The frame 928 defines central opening that is configured to receive secondary filter media 138. In some arrangements, the frame 928 is made from injection molded plastic. The frame 928 may include stabilizers that extend from the frame away from the central opening and may be configured to interact with a filter housing 102 to help stabilize the secondary filter element 108 within the filter housing 102. In some arrangements, the frame 928 may include a plurality of flow passages extending through the frame 928 thereby reducing the amount of area of the filter media packs masked off by the frame 928.

FIG. 10A shows a perspective view of a filtration system 1000 with a latch element with a snap fit handle portion, according to another exemplary embodiment. FIG. 10B shows a cross-sectional view of the filtration system 100 with the pair of latch elements 1020 with a snap fit handle portion 1040 along a first end 1004 (e.g., top end) of the housing 1002 to engage a first end 1014 (e.g., top end) of the filter element 1008. The pair of latch elements 1020 include a filter latch element 1022 and a housing latch portion 1024. The filter element 1008 and the housing 1002 are cylindrical. FIG. 10C shows a perspective view of the housing 1002 of the filtration system 1000 with housing latch portion 1024 with a snap fit handle portion 1040 of FIG. 10A. The housing 1002 includes a housing latch portion 1024 disposed on an internal surface 1080 around a center portion of the housing 1002. FIG. 10D shows a perspective view of a filter element 1008 of the filtration system with the filter latch element 1022. The filter latch element 1022 is complementary to and configured to engage the housing latch portion 1020. In some embodiments, the filter latch element 1022 is a male protruding member configured to slide into a complementary female portion. In some embodiments, the opening adjacent the male protruding member receives a complementary male protruding member of the housing latch portion 1024.

FIG. 11A shows a perspective view of a housing 1102 of the filtration system with a latch element 1122 with a snap fit handle portion in the form of a male protruding member 1126. The housing 1102 includes a housing latch portion 1124 disposed on an internal surface 1180 around a center portion of the housing 1102. The housing latch portion 1124 may be a female portion that is an opening disposed within the internal surface 1180 of the housing 1102. FIG. 11B shows a perspective view of a filter element 1108 of the filtration system 1100 with the filter latch element 1122. The filter latch element 1122 is complementary to and configured to engage the housing latch portion 1120. In some embodiments, the filter latch element is a male protruding member 1126 configured to slide into the female receiving member of the housing latch portion 1124. The filter element 1108 is shown as a cylindrical filter element (for example, having a circular, oval or racetrack-shaped cross section) and generally comprises a hollow cylinder of filter media, a first endcap, and a second endcap.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," etc.) are merely used to describe the orientation of various elements in the figures. It should be noted that the orientation of various elements may differ according to other example embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A latch element for use with a filter element, comprising:
 a first end and a second end spaced laterally from the first end;
 an engagement portion disposed between the first end and the second end, the engagement portion configured to engage a filter element housing;
 a clip portion disposed at least partially between the engagement portion and the first end, the clip portion comprising a first arm extending in an at least partially axial direction, and a protruding member extending away from the first arm, the first arm and the engagement portion together defining an engagement detent sized to receive a portion of the filter element housing therein; and
 a handle portion adjacent to the second end and extending parallel to the protruding member, the handle portion configured to engage the filter element and facilitate removal of the filter element,
 an end of the clip portion extending in a first direction from an end of the handle portion and an end of the engagement portion extending in a second direction from the end of the handle portion, the second direction being different from the first direction, the clip portion moving in the axial direction in response to axial movement of the second end with respect to the engagement portion to maintain the protruding member in a substantially parallel orientation with respect to the handle portion.

2. The latch element of claim 1, wherein the second end rotates about the engagement portion between a first position and a second position, in the first position the handle portion is adjacent a top surface of a filter media of the filter element, and in the second position the handle portion is displaced away from the first position in a direction away from the filter media.

3. The latch element of claim 2, wherein the clip portion is configured to engage a detent portion of an inner surface of a filter housing to couple the filter element within the filter housing, wherein the clip portion engages the detent portion of the inner surface when the second end is in the first position, and wherein the clip portion disengages the detent portion when the second end transitions to the second position.

4. The latch element of claim 2, wherein the clip portion is a v-shaped clip portion, the v-shaped clip portion comprising a base portion, the first arm, and a second flexible arm, the base portion adjacent to the engagement portion, the first arm extending from the base portion away from the second end, the second flexible arm extending from the first arm toward the first end.

5. The latch element of claim 4, wherein the v-shaped clip portion is configured to engage a detent portion of an inner surface of a filter housing with a portion of the second flexible arm to couple the filter element within the filter housing, wherein the v-shaped clip portion engages the detent portion of the inner surface when the second end is in the first position and wherein the v-shaped clip portion disengages the detent portion when the second end transitions to the second position.

6. The latch element of claim 1, wherein the protruding member is engaged with and extends away from the second flexible arm, the protruding member configured to engage the detent portion of the inner surface of the filter housing, wherein the second flexible arm flexes radially inward toward the second end as the protruding member passes the detent portion.

7. The latch element of claim 1, wherein the handle portion comprises a touch surface adjacent the second end and a handle opening defined between the engagement portion and the second end, the touch surface configured to facilitate rotation of the second end about the engagement portion between a first position and a second position, in the first position the handle portion is adjacent a top surface of a filter media of the filter element, and in the second position the handle portion is displaced away from the first position in a direction away from the filter media.

8. A filtration system, comprising:
   a filter element comprising a filter element housing and filter media;
   a filter housing; and
   a latch element comprising:
      a first end and a second end spaced laterally from the first end;
      an engagement portion disposed between the first end and the second end, the engagement portion configured to engage the filter element housing;
      a clip portion disposed at least partially between the engagement portion and the first end, the clip portion comprising a first arm extending in an at least partially axial direction, the first arm and the engagement portion together defining an engagement detent, the clip portion further comprising a base portion disposed between the first arm and the engagement portion, the filter element housing disposed within the engagement detent and engaged with the base portion; and
      a handle portion adjacent to the second end, the handle portion configured to engage the filter element and facilitate removal of the filter element from the filter housing,
      an end of the clip portion extending in a first direction from an end of the handle portion and an end of the engagement portion extending in a second direction from the end of the handle portion, the second direction being different from the first direction, the clip portion moving in an axial direction in response to axial movement of the second end away from the filter media.

9. The filtration system of claim 8, wherein the filter housing comprises a detent portion on an inner surface thereof, wherein the second end rotates about the engagement portion between a first position and a second position, in the first position the handle portion is adjacent a top surface of the filter media of the filter element, and in the second position the handle portion is displaced away from the first position in a direction away from the filter media.

10. The filtration system of claim 9, wherein the clip portion is configured to engage the detent portion of the inner surface of the filter housing to couple the filter element within the filter housing, wherein the clip portion engages the detent portion of the inner surface when the second end is in the first position and wherein the clip portion disengages the detent portion when the second end transitions to the second position.

11. The filtration system of claim 9, wherein the clip portion is a v-shaped clip portion, the v-shaped clip portion comprising the base portion, the first arm, and a second flexible arm, the base portion adjacent to the engagement portion, the first arm extending from the base portion away from the second end, the second flexible arm extending from the first arm toward the first end.

12. The filtration system of claim 11, wherein the v-shaped clip portion is configured to engage the detent portion of the inner surface of the filter housing with a portion of the second flexible arm to couple the filter element within the filter housing, wherein the v-shaped clip portion engages the detent portion of the inner surface when the second end is in the first position and wherein the v-shaped clip portion disengages the detent portion when the second end transitions to the second position.

13. The filtration system of claim 12, wherein the second flexible arm comprises a protruding member configured to engage the detent portion of the inner surface of the filter housing, wherein the second flexible arm flexes radially inward toward the second end as the protruding member passes the detent portion.

14. The filtration system of claim 8, wherein the handle portion comprises a touch surface adjacent the second end and a handle opening defined between the engagement portion and the second end, the touch surface configured to facilitate rotation of the second end about the engagement portion between a first position and a second position, in the first position the handle portion is adjacent a top surface of the filter media of the filter element, and in the second position the handle portion is displaced away from the first position in a direction away from the filter media.

* * * * *